United States Patent
Shao et al.

(12)

(10) Patent No.: US 10,285,136 B2
(45) Date of Patent: *May 7, 2019

(54) POWER ALLOCATION METHOD AND APPARATUS

(71) Applicant: Huawei Technologies Co., Ltd., Shenzhen (CN)

(72) Inventors: Jiafeng Shao, Beijing (CN); Bingyu Qu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/945,438

(22) Filed: Apr. 4, 2018

(65) Prior Publication Data

US 2018/0227857 A1    Aug. 9, 2018

Related U.S. Application Data

(63) Continuation of application No. 15/345,835, filed on Nov. 8, 2016, now Pat. No. 9,955,430, which is a
(Continued)

(51) Int. Cl.
*H04B 7/00* (2006.01)
*H04W 52/04* (2009.01)
(Continued)

(52) U.S. Cl.
CPC ........... *H04W 52/04* (2013.01); *H04W 24/02* (2013.01); *H04W 52/146* (2013.01);
(Continued)

(58) Field of Classification Search
CPC ... H04W 52/04; H04W 24/02; H04W 52/146; H04W 52/281; H04W 52/367; H04W 52/40; H04W 56/0045
(Continued)

(56) References Cited

U.S. PATENT DOCUMENTS 8,705,481 B2   4/2014  Suzuki et al.
9,215,686 B2 * 12/2015  Kazmi ................... H04B 17/27
(Continued)

FOREIGN PATENT DOCUMENTS

CN    102083184 A    6/2011
CN    102378339 A    3/2012
(Continued)

OTHER PUBLICATIONS

Machine Translation and Abstract of Chinese Publication No. CN102083184, Jun. 1, 2011, 9 pages.
(Continued)

*Primary Examiner* — Sonny Trinh
(74) *Attorney, Agent, or Firm* — Conley Rose, P.C.

(57) ABSTRACT

A power allocation method and apparatus that relate to the wireless communications field. The method includes determining, by the user equipment (UE), a first channel in a first subframe; determining, by the UE, n second channels in n second subframes, where the n second subframes are subframes having overlapping time greater than or equal to a preset threshold with the first subframe; allocating, by the UE, transmit power at least to the first channel according to transmit power required for the first channel and transmit power required for the n second channels; and sending, by the UE, data to a first base station/first cell group on the first channel according to the transmit power allocated to the first channel.

18 Claims, 6 Drawing Sheets

Related U.S. Application Data continuation of application No. PCT/CN2014/077062, filed on May 8, 2014.

(51) Int. Cl.

| | |
|---|---|
| *H04W 52/28* | (2009.01) |
| *H04W 52/34* | (2009.01) |
| *H04W 52/36* | (2009.01) |
| *H04W 52/40* | (2009.01) |
| *H04W 52/14* | (2009.01) |
| *H04W 24/02* | (2009.01) |
| *H04W 56/00* | (2009.01) |

(52) U.S. Cl.
 CPC ....... *H04W 52/281* (2013.01); *H04W 52/346* (2013.01); *H04W 52/367* (2013.01); *H04W 52/40* (2013.01); *H04W 56/0045* (2013.01)

(58) Field of Classification Search
 USPC .............................................. 455/522, 127.1
 See application file for complete search history.

(56) References Cited

U.S. PATENT DOCUMENTS

| | | |
|---|---|---|
| 2013/0279433 A1 | 10/2013 | Dinan |
| 2014/0029532 A1 | 1/2014 | Han et al. |
| 2014/0050205 A1 | 2/2014 | Ann et al. |
| 2014/0293947 A1 | 10/2014 | Nishikawa et al. |
| 2014/0314014 A1 | 10/2014 | Zhang et al. |
| 2015/0036666 A1 | 2/2015 | Blankenship et al. |
| 2015/0063245 A1 | 3/2015 | Gao et al. |
| 2016/0044611 A1 | 2/2016 | Dai et al. |
| 2017/0230917 A1* | 8/2017 | Ouchi ................. H04W 52/367 |

FOREIGN PATENT DOCUMENTS

| | | |
|---|---|---|
| CN | 102572967 A | 7/2012 |
| CN | 103124428 A | 5/2013 |
| CN | 103167594 A | 6/2013 |
| CN | 103200605 A | 7/2013 |
| CN | 103220768 A | 7/2013 |
| CN | 103369650 A | 10/2013 |
| JP | 2013102398 A | 5/2013 |
| WO | 2013067430 A1 | 5/2013 |

OTHER PUBLICATIONS

Machine Translation and Abstract of Chinese Publication No. CN102378339, Mar. 14, 2012, 14 pages.
Machine Translation and Abstract of Chinese Publication No. CN103200605, Jul. 10, 2013, 17 pages.
"3rd Generation Partnership Project; Technical Specification Group Radio Access Network; Evolved Universal Terrestrial Radio Access (E-UTRA); Requirements for support of radio resource management (Release 12)," 3GPP TS 36.133, V12.3.0, Mar. 2014, pp. 1-25.
"3rd Generation Partnership Project; Technical Specification Group Radio Access Network; Evolved Universal Terrestrial Radio Access (E-UTRA); Requirements for support of radio resource management (Release 10)," 3GPP TS 36.133, V10.14.0, Mar. 2014, pp. 26-163.
"3rd Generation Partnership Project; Technical Specification Group Radio Access Network; Evolved Universal Terrestrial Radio Access (E-UTRA); Requirements for support of radio resource management (Release 10)," 3GPP TS 36.133, V10.14.0, Mar. 2014, pp. 164-357.
"3rd Generation Partnership Project; Technical Specification Group Radio Access Network; Evolved Universal Terrestrial Radio Access (E-UTRA); Requirements for support of radio resource management (Release 10)," 3GPP TS 36.133, V10.14.0, Mar. 2014, pp. 358-653.
"3rd Generation Partnership Project; Technical Specification Group Radio Access Network; Evolved Universal Terrestrial Radio Access (E-UTRA); Requirements for support of radio resource management (Release 10)," 3GPP TS 36.133, V10.14.0, Mar. 2014, pp. 654-820.
"3rd Generation Partnership Project; Technical Specification Group Radio Access Network; Evolved Universal Terrestrial Radio Access (E-UTRA); Physical layer procedures (Release 12)," 3GPP TS 36.213, V12.1.0, Mar. 2014, 186 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.1.0, Mar. 2014, 209 pages.
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.1.0, Mar. 2014, 356 pages.
Huawei, "Uplink Power allocation in Dual connectivity," 3GPP TSG-RAN WG1#76bis, R1-141134, Apr. 4, 2014, 5 pages.
RAN2 "LS on SFN handling in the dual connectivity," 3GPP TSG-RAN WG3#83bis, 3GPP, R3-140962, Apr. 4, 2014, 3 pages.
Huawei, et al., "Issues on UL max transmit timing difference between TAGs," 3GPP TSG-RAN WG4 Meeting #69, R4-136414, Nov. 11-15, 2013, 3 pages.
Huawei "Discussion on UE behaviour when max timing difference on UL is reached," 3GPP TSG-RAN WG4 Meeting #70, R4-140193, Feb. 10-14, 2014, 3 pages.
TSG-RAN WG4,"[Draft] LS on UE behavior considering max transmit timing difference between TAGs," 3GPP TSG-RAN WG4 Meeting #70, R4-140218, Feb. 10-14, 2014, 1 page.
Foreign Communication From a Counterpart Application, Japanese Application No. 2016-566987, Japanese Office Action dated Jan. 23, 2018, 5 pages.
Foreign Communication From a Counterpart Application, Japanese Application No. 2016-566987, English Translation of Japanese Office Action dated Jan. 23, 2018, 7 pages.
Foreign Communication From a Counterpart Application, European Application No. 14891141.5, Extended European Search Report dated Mar. 7, 2017, 9 pages.
Foreign Communication From a Counterpart Application, PCT Application No. PCT/CN2014/077062, English Translation of International Search Report dated Dec. 31, 2014, 2 pages.
Foreign Communication From a Counterpart Application, PCT Application No. PCT/CN2014/077062, English Translation of Written Opinion dated Dec. 31, 2014, 11 pages.
Machine Translation and Abstract of Chinese Publication No. CN102572967, Jul. 11, 2012, 50 pages.
Machine Translation and Abstract of Chinese Publication No. CN103124428, May 29, 2013, 35 pages.
Machine Translation and Abstract of Chinese Publication No. CN103220768, Jul. 24, 2013, 39 pages.
Foreign Communication From a Counterpart Application, Chinese Application No. 201480078448.3, Chinese Office Action dated Mar. 5, 2019, 10 pages.

\* cited by examiner

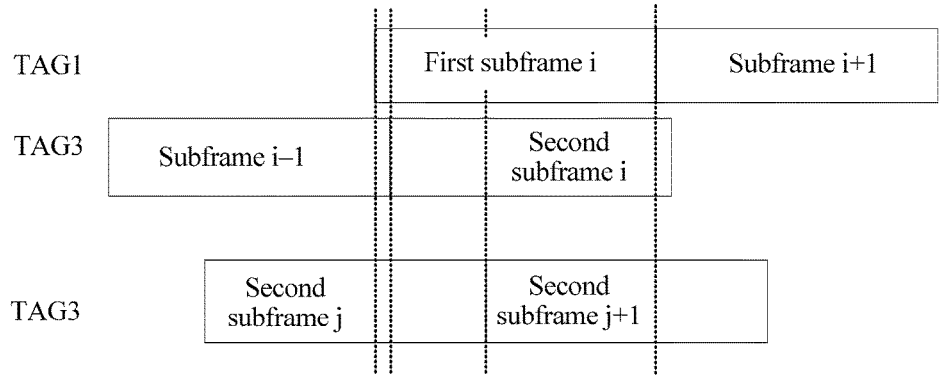

FIG. 6

UE determines, according to priorities of channels in subframes whose subframe numbers are i and a priority of at least one second channel in subframes whose subframe numbers are j, first pre-allocated transmit power of a first channel in a first subframe whose subframe number is i and second pre-allocated transmit power of at least one second channel in second subframes whose subframe numbers are i and the at least one second channel in the subframes whose subframe numbers are j, where the first pre-allocated transmit power and the second pre-allocated transmit power make total transmit power of the UE less than or equal to maximum transmit power of the UE — S501

The UE determines, according to the priorities of the channels in the subframes whose subframe numbers are i and a priority of at least one second channel in a subframe whose subframe number is j+1, third pre-allocated transmit power of the first channel in the first subframe whose subframe number is i and fourth pre-allocated transmit power of the at least one second channel in the second subframes whose subframe numbers are i and the at least one second channel in the subframe whose subframe number is j, where the third pre-allocated transmit power and the fourth pre-allocated transmit power make the total transmit power of the UE less than or equal to the maximum transmit power of the UE — S502

The UE uses smaller pre-allocated transmit power in the first pre-allocated transmit power and the third pre-allocated transmit power as transmit power allocated at least to the first channel — S503

FIG. 7 ant application, to the uplink channel that is in the TAG of the base station and in the uplink subframe, which causes a relatively large implementation difficulty.

POWER ALLOCATION METHOD AND APPARATUS

CROSS-REFERENCE TO RELATED APPLICATIONS

This application is a continuation of U.S. patent application Ser. No. 15/345,835, filed on Nov. 8, 2016, which is a continuation of International Patent application number PCT/CN2014/077062, filed on May 8, 2014. The aforementioned patent applications are hereby incorporated by reference in their entireties.

TECHNICAL FIELD

The present disclosure relates to the wireless communications field, and in particular, to a power allocation method and apparatus.

BACKGROUND

Currently, an inter-base station carrier aggregation technology is introduced in a Long-Term Evolution Advanced (LTE-A) system. The inter-base station carrier aggregation technology may also be referred to as a dual-connectivity technology. In the dual-connectivity technology, because data transmission between two base stations that perform carrier aggregation is non-ideal backhaul, start moments of downlink subframes sent by the two base stations to user equipment (UE) may be asynchronous (which is an asynchronous dual-connectivity scenario), that is, there may be any time difference between the start moments of the downlink subframes of the two base stations. In addition, each base station may receive uplink subframes corresponding to multiple different timing advance groups (TAGs). Therefore, there may also be any time difference between start moments of uplink subframes sent by the UE to the two base stations, that is, there may be an overlapping time between these uplink subframes. The overlapping time is a non-fixed value. A TAG is a cell group, and uplink transmission channels of UE in cells of the group have same timing. If cells of two channels belong to a same TAG, the two channels have a same uplink transmission timing advance, and the two channels have same uplink transmission timing. Different TAGs have different timing advances, and therefore, each TAG may have different uplink transmission time.

In some approaches, in the foregoing asynchronous dual-connectivity scenario, before the UE sends the uplink subframes to the two base stations, the UE needs to allocate transmit power to uplink channels in the uplink subframes, so as to implement data transmission between the UE and the two base stations. There are overlapping time between multiple uplink subframes, and the overlapping time is a non-fixed value; therefore, when allocating transmit power to an uplink channel that is in a TAG of a base station and in an uplink subframe, the UE needs to consider transmit power of uplink channels that are in all TAGs of the two base stations and that are in all uplink subframes having overlapping time with the uplink subframe.

However, when allocating transmit power to an uplink channel that is in a TAG of a base station and in the uplink subframe, the UE needs to consider the transmit power of the uplink channels that are in all the TAGs of the two base stations and that are in all the uplink subframes having overlapping time with the uplink subframe. Therefore, in an asynchronous dual-connectivity scenario, the UE allocates, by using an extremely complex solution, the transmit power

SUMMARY

Embodiments of the present disclosure provide a power allocation method and apparatus, which can reduce complexity of allocating, by UE in an asynchronous dual-connectivity scenario, transmit power to an uplink channel that is in a TAG of a base station and in an uplink subframe, and are easy for implementation.

To achieve the foregoing objective, the following technical solutions are used in the embodiments of the present disclosure:

According to a first aspect, an embodiment of the present disclosure provides a power allocation method, including determining, by UE, a first channel in a first subframe, where the first channel belongs to a first TAG, and the first TAG is a TAG of a first base station/first cell group; determining, by the UE, n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≤m≤1, and m and n are positive integers; allocating, by the UE, transmit power at least to the first channel according to transmit power required for the first channel and transmit power required for the n second channels; and sending, by the UE, data to the first base station/first cell group on the first channel according to the transmit power allocated to the first channel.

In a first possible implementation manner of the first aspect, the allocating, by the UE, transmit power at least to the first channel according to transmit power required for the first channel and transmit power required for the n second channels specifically includes allocating, by the UE, the transmit power at least to the first channel according to a priority of the first channel and priorities of the n second channels when the transmit power required for the first channel and the transmit power required for the n second channels make total transmit power of the UE greater than maximum transmit power of the UE.

With reference to the first possible implementation manner of the first aspect, in a second possible implementation manner, if the subframe number of the first subframe is i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the second subframes whose subframe numbers are j and the second subframe whose subframe number is j+1 belong to the second base station/second cell group, the allocating, by the UE, transmit power at least to the first channel according to transmit power required for the first channel and transmit power required for the n second channels specifically includes determining, by the UE according to a priority of the channel in the subframe whose subframe number is i and a priority of at least one second channel in the subframes whose subframe numbers are j, first pre-allocated transmit power of the first channel in the first subframe whose subframe number is i and second pre-allocated transmit power of the at least one second channel in the subframes whose subframe numbers are j, where the first pre-allocated transmit power and the second pre-allocated transmit power make the total transmit power of the UE less than or equal to the maximum transmit power of the UE; determining, by the UE according to the priority of the channel in the subframe whose subframe number is i and a priority of at least one second channel in the subframe whose subframe number is j+1, third pre-allocated transmit power of the first channel in the first subframe whose subframe number is i and fourth pre-allocated transmit power of the at least one second channel in the subframe whose subframe number is j+1, where the third pre-allocated transmit power and the fourth pre-allocated transmit power make the total transmit power of the UE less than or equal to the maximum transmit power of the UE; and using, by the UE, smaller pre-allocated transmit power in the first pre-allocated transmit power and the third pre-allocated transmit power as the transmit power allocated at least to the first channel.

With reference to the second possible implementation manner of the first aspect, in a third possible implementation manner, the priority of the at least one second channel in the subframe whose subframe number is j+1 is higher than or equal to the priority of the first channel in the first subframe whose subframe number is i, and/or the priority of the at least one second channel in the subframe whose subframe number is j+1 is higher than a priority of a channel in a subframe whose subframe number is i+1, where the channel in the subframe whose subframe number is i+1 is a channel in a next subframe of the first subframe whose subframe number is i.

With reference to any one of the foregoing first aspect, or the first possible implementation manner to the third possible implementation manner of the first aspect, in a fourth possible implementation manner, the determining, by UE, a first channel in a first subframe specifically includes determining, by the UE, the first channel in the first subframe according to a preset condition.

With reference to the fourth possible implementation manner of the first aspect, in a fifth possible implementation manner, the preset condition includes a priority of a channel that is in the first base station/first cell group and that is in a subframe whose subframe number is the same as that of the first subframe; or a transmission time of a channel that is in the first base station/first cell group and that is in a subframe whose subframe number is the same as that of the first subframe; and determining, by the UE according to the preset condition, the first channel that is in the first TAG and in the first subframe specifically includes determining, by the UE as the first channel according to the priority of the channel that is in the first base station/first cell group and that is in the subframe whose subframe number is the same as that of the first subframe, one of at least one channel that is in the first base station/first cell group and that has a highest priority in the subframe whose subframe number is the same as that of the first subframe; or determining, by the UE as the first channel according to the transmission time of the channel that is in the first base station/first cell group and that is in the subframe whose subframe number is the same as that of the first subframe, a channel that is in the first base station/first cell group and that is the first or the last channel transmitted in the subframe whose subframe number is the same as that of the first subframe, where a subframe in which the first channel is located is the first subframe, and a TAG in which the first channel is located is the first TAG.

With reference to any one of the foregoing first aspect, or the first possible implementation manner to the fifth possible implementation manner of the first aspect, in a sixth possible implementation manner, the preset threshold is sent by the first base station or the second base station by using signaling, or is predefined.

According to a second aspect, an embodiment of the present disclosure further provides a power allocation method, including determining, by a base station, a preset threshold; and sending, by the base station, the preset threshold to UE, so that the UE determines a first channel in a first subframe, determines, according to the preset threshold, m second channels in m second subframes having overlapping time with the first subframe, and/or n–m second channels in n–m second subframes, and allocates transmit power at least to the first channel according to transmit power required for the first channel and transmit power required for n second channels.

In a first possible implementation manner of the second aspect, the preset threshold is sent by using the following method: sending the preset threshold by adding the preset threshold to signaling.

According to a third aspect, an embodiment of the present disclosure provides UE, including a determining unit configured to determine a first channel in a first subframe, where the first channel belongs to a first TAG, and the first TAG is a TAG of a first base station/first cell group; where the determining unit is further configured to determine n second channels in n second subframes, where the n second channels include m second channels in m second subframes of the n second subframes, and/or n–m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers; an allocation unit configured to allocate transmit power at least to the first channel according to transmit power required for the first channel determined by the determining unit and transmit power required for the n second channels determined by the determining unit; and a sending unit configured to send data to the first base station/first cell group on the first channel according to the transmit power allocated to the first channel by the allocation unit.

In a first possible implementation manner of the third aspect, the allocation unit is specifically configured to allocate, according to a priority of the first channel determined by the determining unit and priorities of the n second channels determined by the determining unit, the transmit power at least to the first channel when the transmit power required for the first channel determined by the determining unit and the transmit power required for the n second channels determined by the determining unit make total transmit power of the UE greater than maximum transmit power of the UE.

With reference to the first possible implementation manner of the third aspect, in a second possible implementation manner, if the subframe number of the first subframe is i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the second subframes whose subframe numbers are j and the second subframe whose subframe number is j+1 belong to the second base station/ second cell group, the determining unit is specifically configured to: determine, according to a priority of the channel in the subframe whose subframe number is i and a priority of at least one second channel in the subframes whose subframe numbers are j, first pre-allocated transmit power of the first channel in the first subframe whose subframe number is i and second pre-allocated transmit power of the at least one second channel in the subframes whose subframe numbers are j, where the first pre-allocated transmit power and the second pre-allocated transmit power make the total transmit power of the UE less than or equal to the maximum transmit power of the UE; and determine, according to the priority of the channel in the subframe whose subframe number is i and a priority of at least one second channel in the subframe whose subframe number is j+1, third pre-allocated transmit power of the first channel in the first subframe whose subframe number is i and fourth pre-allocated transmit power of the at least one second channel in the subframe whose subframe number is j+1, where the third pre-allocated transmit power and the fourth pre-allocated transmit power make the total transmit power of the UE less than or equal to the maximum transmit power of the UE; and the allocation unit is further specifically configured to use, as the transmit power allocated at least to the first channel, smaller pre-allocated transmit power in the first pre-allocated transmit power and the third pre-allocated transmit power that are determined by the determining unit.

With reference to the second possible implementation manner of the third aspect, in a third possible implementation manner, the priority of the at least one second channel that is determined by the determining unit and that is in the subframe whose subframe number is j+1 is higher than or equal to the priority of the first channel in the first subframe whose subframe number is i, and/or the priority of the at least one second channel in the subframe whose subframe number is j+1 is higher than a priority of a channel in a subframe whose subframe number is i+1, where the channel in the subframe whose subframe number is i+1 is a channel in a next subframe of the first subframe whose subframe number is i.

With reference to any one of the foregoing third aspect, or the first possible implementation manner to the third possible implementation manner of the third aspect, in a fourth possible implementation manner, the determining unit is further specifically configured to determine the first channel in the first subframe according to a preset condition.

With reference to the fourth possible implementation manner of the third aspect, in a fifth possible implementation manner, the preset condition includes a priority of a channel that is in the first base station/first cell group and that is in a subframe whose subframe number is the same as that of the first subframe; or a transmission time of a channel that is in the first base station/first cell group and that is in a subframe whose subframe number is the same as that of the first subframe; and the determining unit is further specifically configured to: determine, as the first channel according to the priority of the channel that is in the first base station/first cell group and that is in the subframe whose subframe number is the same as that of the first subframe, one of at least one channel that is in the first base station/first cell group and that has a highest priority in the subframe whose subframe number is the same as that of the first subframe; or determine, as the first channel according to the transmission time of the channel that is in the first base station/first cell group and that is in the subframe whose subframe number is the same as that of the first subframe, a channel that is in the first base station/first cell group and that is the first or the last channel transmitted in the subframe whose subframe number is the same as that of the first subframe, where a subframe in which the first channel is located is the first subframe, and a TAG in which the first channel is located is the first TAG.

With reference to any one of the foregoing third aspect, or the first possible implementation manner to the fifth possible implementation manner of the third aspect, in a sixth possible implementation manner, the preset threshold is sent by the first base station or the second base station by using signaling, or is predefined.

According to a fourth aspect, an embodiment of the present disclosure provides a base station, where the base station includes a determining unit configured to determine a preset threshold; and a sending unit configured to send the preset threshold determined by the determining unit to UE, so that the UE determines a first channel in a first subframe, determines, according to the preset threshold, m second channels in m second subframes having overlapping time with the first subframe, and/or n−m second channels in n−m second subframes, and allocates transmit power at least to the first channel according to transmit power required for the first channel and transmit power required for n second channels.

In a first possible implementation manner of the fourth aspect, the preset threshold is carried in signaling for sending.

According to a fifth aspect, an embodiment of the present disclosure provides UE, including a processor configured to: determine a first channel in a first subframe, where the first channel belongs to a first TAG, and the first TAG is a TAG of a first base station/first cell group; determine n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers; and allocate transmit power at least to the first channel according to transmit power required for the first channel and transmit power required for the n second channels; and a transmitter configured to send data to the first base station/first cell group on the first channel according to the transmit power allocated to the first channel by the processor.

In a first possible implementation manner of the fifth aspect, the processor is specifically configured to allocate the transmit power at least to the first channel according to a priority of the first channel and priorities of the n second channels when the transmit power required for the first channel and the transmit power required for the n second channels make total transmit power of the UE greater than maximum transmit power of the UE.

With reference to the first possible implementation manner of the fifth aspect, in a second possible implementation manner, if the subframe number of the first subframe is i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the second subframes whose subframe numbers are j and the second subframe whose subframe number is j+1 belong to the second base station/second cell group, the processor is further specifically configured to: determine, according to a priority of the channel in the subframe whose subframe number is i and a priority of at least one second channel in the subframes whose subframe numbers are j, first pre-allocated transmit power of the first channel in the first subframe whose subframe number is i and second pre-allocated transmit power of the at least one second channel in the subframes whose subframe numbers are j, where the first pre-allocated transmit power and the second pre-allocated transmit power make the total transmit power of the UE less than or equal to the maximum transmit power of the UE; determine, according to the priority of the channel in the subframe whose subframe number is i and a priority of at least one second channel in the subframe whose subframe number is j+1, third pre-allocated transmit power of the first channel in the first subframe whose subframe number is i and fourth pre-allocated transmit power of the at least one second channel in the subframe whose subframe number is j+1, where the third pre-allocated transmit power and the fourth pre-allocated transmit power make the total transmit power of the UE less than or equal to the maximum transmit power of the UE; and use smaller pre-allocated transmit power in the first pre-allocated transmit power and the third pre-allocated transmit power as the transmit power allocated at least to the first channel.

With reference to the second possible implementation manner of the fifth aspect, in a third possible implementation manner, the priority of the at least one second channel that is determined by the processor and that is in the subframe whose subframe number is j+1 is higher than or equal to the priority of the first channel in the first subframe whose subframe number is i, and/or the priority of the at least one second channel in the subframe whose subframe number is j+1 is higher than a priority of a channel in a subframe whose subframe number is i+1, where the channel in the subframe whose subframe number is i+1 is a channel in a next subframe of the first subframe whose subframe number is i.

With reference to any one of the foregoing fifth aspect, or the first possible implementation manner to the third possible implementation manner of the fifth aspect, in a fourth possible implementation manner, the processor is further specifically configured to determine the first channel in the first subframe according to a preset condition.

With reference to the fourth possible implementation manner of the fifth aspect, in a fifth possible implementation manner, the preset condition includes a priority of a channel that is in the first base station/first cell group and that is in a subframe whose subframe number is the same as that of the first subframe; or a transmission time of a channel that is in the first base station/first cell group and that is in a subframe whose subframe number is the same as that of the first subframe; and the processor is further specifically configured to: determine, as the first channel according to the priority of the channel that is in the first base station/first cell group and that is in the subframe whose subframe number is the same as that of the first subframe, one of at least one channel that is in the first base station/first cell group and that has a highest priority in the subframe whose subframe number is the same as that of the first subframe; or determine, as the first channel according to the transmission time of the channel that is in the first base station/first cell group and that is in the subframe whose subframe number is the same as that of the first subframe, a channel that is in the first base station/first cell group and that is the first or the last channel transmitted in the subframe whose subframe number is the same as that of the first subframe, where a subframe in which the first channel is located is the first subframe, and a TAG in which the first channel is located is the first TAG.

With reference to any one of the foregoing fifth aspect, or the first possible implementation manner to the fifth possible implementation manner of the fifth aspect, in a sixth possible implementation manner, the preset threshold is sent by the first base station or the second base station by using signaling, or is predefined.

According to a sixth aspect, an embodiment of the present disclosure provides a base station, including a processor configured to determine a preset threshold; and a transmitter configured to send the preset threshold determined by the processor to UE, so that the UE determines a first channel in a first subframe, determines, according to the preset threshold, m second channels in m second subframes having overlapping time with the first subframe, and/or n−m second channels in n−m second subframes, and allocates transmit power at least to the first channel according to transmit power required for the first channel and transmit power required for n second channels.

In a first possible implementation manner of the sixth aspect, the preset threshold is carried in signaling for sending.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from the accompanying drawings without creative efforts.

FIG. 6 is a schematic structural diagram 2 of a subframe according to an embodiment of the present disclosure;

FIG. 7 is a flowchart 3 of a power allocation method according to an embodiment of the present disclosure;

DESCRIPTION OF EMBODIMENTS

The following clearly describes the technical solutions in embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Various technologies described in this specification may be used in various wireless communications systems, for example, current second generation (2G) and third generation (3G) communications systems and a next-generation communications system, such as a Global System for Mobile Communications (GSM), a code-division multiple access (CDMA) system, a time-division multiple access (TDMA) system, a wideband CDMA (WCDMA) system, a frequency-division multiple access (FDMA) system, an orthogonal frequency-division multiple access (OFDMA) system, a single-carrier FDMA (SC-FDMA) system, a General Packet Radio Service (GPRS) system, a long-term evolution (LTE) system, and another communications system.

UE may be a wireless terminal or may be a wired terminal. The wireless terminal may refer to a device that provides voice and/or data connectivity for a user, a hand-held device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the RAN, such as a personal communications service (PCS) phone, a cordless telephone set, a Session Initiation Protocol (SIP) phone, a wireless local loop (WLL) station, a personal digital assistant (PDA), or another device. The wireless terminal may also be referred to as a system, a subscriber unit, a subscriber station, a mobile station, a mobile, a remote station, an access point, a remote terminal, an access terminal, a user terminal, a user agent, or UE.

A base station may be an evolved NodeB (eNB), a radio network controller (RNC), or a base station controller (BSC), that is, an access network device.

Specifically, a packet-switched (PS) domain in a mobile communications system is used as an example. In 3G, the base station is an RNC; in fourth generation (4G), the base station is an eNB; and in 2G, the base station is a BSC. A circuit-switched (CS) domain in the mobile communications system is used as an example. In 3G/2G, the base station is an RNC (3G)/RNC (2G).

Embodiment 1

Figure 1:
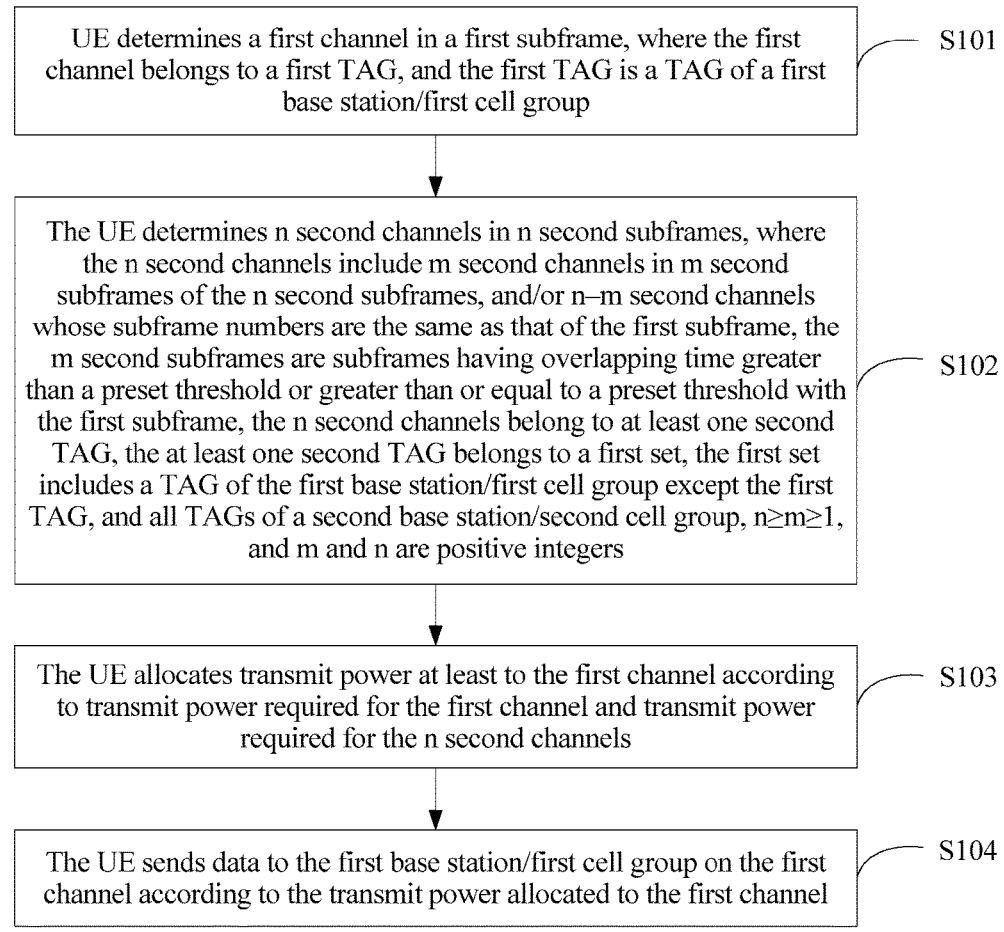
FIG. 1 is a flowchart 1 of a power allocation method according to an embodiment of the present disclosure.

This embodiment of the present disclosure provides a power allocation method corresponding to a UE side. As shown in FIG. 1, the method may include the following.

S101. UE determines a first channel in a first subframe, where the first channel belongs to a first TAG, and the first TAG is a TAG of a first base station/first cell group.

In an asynchronous dual-connectivity scenario, the UE is connected to two base stations to send and receive data, and the two base stations are a master base station and a secondary base station. There is any time difference between start moments of downlink subframes of the master base station and the secondary base station, so that there are overlapping time between multiple uplink channels sent by the UE to the master base station and the secondary base station. The overlapping time may be any time difference, that is, a non-fixed value. The power allocation method provided in this embodiment of the present disclosure is a method for allocating transmit power to an uplink channel in the asynchronous dual-connectivity scenario, that is, in this embodiment of the present disclosure, the first channel is an uplink channel, and the first subframe is an uplink subframe.

It should be noted that the master base station or the secondary base station may include one or more cell groups, a cell group of the master base station may be referred to as a master cell group (MCG), and a cell group of the secondary base station may be referred to as a secondary cell group (SCG). In the asynchronous dual-connectivity scenario, the master base station or the secondary base station may separately support four TAGs, and each TAG may have one or more cells that have same uplink timing. The first base station in this embodiment of the present disclosure may be a master base station or a secondary base station, which is not limited in the present disclosure. In addition, the cell group in this embodiment of the present disclosure may be replaced with a component carrier group, which is not limited in the present disclosure.

In a time-division duplex LTE (TDD-LTE) system, one frame includes 10 subframes. In the 10 subframes, some subframes are uplink subframes, some subframes are downlink subframes, and there may also be a special subframe. The special subframe includes both an uplink channel and a downlink channel. In a frequency-division duplex LTE (FDD-LTE) system, one uplink radio frame includes 10 uplink subframes, and one downlink radio frame includes 10 downlink subframes. Uplink and downlink are separate in the FDD-LTE system, and different frequencies are used in the uplink and the downlink. A base station sends a downlink channel in a downlink subframe or a special subframe to transmit data to the UE, and the UE sends an uplink channel in an uplink subframe or a special subframe to transmit data to the base station.

In the power allocation method provided in this embodiment of the present disclosure, UE determines a first channel in a first subframe, where the first channel belongs to a first TAG, the first TAG is a TAG of a first base station/first cell group, and the first base station/first cell group provides a service for the UE.

Specifically, the UE determines a first uplink channel in a first uplink subframe, where the first uplink channel belongs to the first TAG, the first TAG is a TAG of the first base station/first cell group, and the first base station/first cell group provides a service for the UE.

It may be understood that the UE allocates transmit power to an uplink channel after the UE receives, in a downlink subframe, scheduling information of an uplink subframe sent by the first base station or a second base station, and before the UE sends the uplink channel in the uplink subframe to transmit uplink data.

In the power allocation method provided in this embodiment of the present disclosure, when UE allocates power to a first channel, a first subframe in which the first channel is located is used as a reference time segment, and the UE needs to consider a channel in a subframe having an overlapping time with the first subframe in which the first channel is located, that is, a second channel, so as to properly and effectively allocate the power.

It should be noted that the first channel may include multiple channels that are in a same TAG and whose subframe numbers are the same, and when power is allocated, these channels also need to be considered.

S102. The UE determines n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers.

After the UE determines the first channel in the first subframe, the UE determines the n second channels in the n second subframes, where the n second channels include the m second channels in the m second subframes of the n second subframes, and/or the n−m second channels whose subframe numbers are the same as a subframe number of the first subframe, the m second subframes are the subframes having the overlapping time greater than the preset threshold or greater than or equal to the preset threshold with the first subframe, the n second channels belong to the at least one second TAG, the at least one second TAG belongs to the first set, the first set includes the TAG of the first base station/first cell group except the first TAG, and all the TAGs of the second base station/second cell group, n≥m≥1, and m and n are positive integers.

It should be noted that if the first base station is a master base station, the second base station is a secondary base station; if the first base station is a secondary base station, the second base station is a master base station. The first cell group is a cell group of the first base station, and the second cell group is a cell group of the second base station.

It should be noted that when the UE actually performs data transmission with a base station, because downlink subframes of a same base station are synchronous, a start moment difference of uplink subframes in TAGs of a same base station or a same cell group is extremely small, for example, less than 32.47 microseconds. For example, subframes with a start moment difference less than 32.47 microseconds may have a same subframe number. Therefore, a subframe number of a subframe in which a second channel in the n second channels is located is i, where the second channel belongs to the first base station/first cell group and overlaps the first channel in the first subframe whose subframe number is i.

Further, the UE may determine the m second channels according to the preset threshold when a sounding reference signal (SRS) is sent in the last symbol of the first subframe in which the first channel is located, for example, when the first channel is a physical uplink shared channel (PUSCH) and an SRS is sent in the last symbol of the first subframe, or when the first channel is a short-format physical uplink control channel (PUCCH), that is, in this case, no SRS is sent in the last symbol of a subframe in which the PUCCH is located. Although there is an overlapping time between the last symbol of the first subframe and the second subframe in which the second channel is located, if the overlapping time is less than the preset threshold or less than or equal to the preset threshold, for example, does not exceed one symbol, the UE may not send the last symbol of the first subframe. In this way, the second channel does not affect power allocation for the first channel, and therefore, the UE does not consider the second channel when allocating power to the first channel. When the first channel is a PUSCH channel, and transmit power of the last symbol may have different configuration from transmit power of another symbol of the first subframe, the UE determines the m second channels according to the preset threshold. For a second channel that does not meet a threshold requirement, transmit power of the last symbol of the first channel may also be configured and the second channel does not need to be considered. When transmit power of the first symbol of the second channel may have different configuration from power of a symbol of the second subframe in which the second channel is located, the UE may also determine the m second channels according to the preset threshold. For a second subframe that does not meet the threshold requirement, transmit power of the first symbol of a second channel in the second subframe may be configured and the second channel does not need to be considered.

Exemplarily, when the first channel is a long-format PUCCH, that is, all SC-FDMA symbols of the first subframe are used for the PUCCH. In this case, if the second channel is a channel, such as a PUCCH channel, with a power allocation priority that is the same as or higher than that of the first channel PUCCH, the UE does not use a preset threshold T1 for the second channel, that is, provided that there is an overlapping time between the second subframe in which the second channel is located and the first subframe in which the first channel is located, the UE considers the second channel when allocating power to the first channel.

Optionally, the preset threshold is sent by the first base station or the second base station by using signaling, or is predefined.

Exemplarily, the preset threshold is T1, and T1 may be a length of one or more SC-FDMA symbols. A specific preset threshold may be set according to an actual situation, and is not specifically limited in the present disclosure.

It should be noted that different preset thresholds may lead to a difference in power allocation for the first channel when the UE needs to process different symbols of a subframe, such as a difference in quantities of symbols that are dropped by the UE or to which no transmit power is allocated. Different channels may be corresponding to different preset thresholds. When the UE allocates power, the UE has same transmit power at least in all symbols in one time segment of one subframe. Generally, first several symbols of a subframe i have same transmit power, and the last one or last several symbols may have different power allocation. A quantity of the last one or last several symbols is cell{T1/Tsymbol}, where ceil is a rounding-up operation, and Tsymbol is a time length that is of an SC-FDMA symbol and that includes a CP length.

Transmit power of the UE is limited in this step. For example, there are overlapping time between the first subframe in which the first channel is located and subframes in which multiple channels are located, where the first channel and the multiple channels belong to a same base station or different base stations. In this way, the UE has the preset threshold T1 to limit the first subframe. For the first subframe, power in a T1 area may not be equal to power in a non-T1 area, and, in the non-T1 area, the UE transmits SC-FDMA symbols at same power.

Further, when the UE determines the m second channels in the m second subframes, the UE first determines z second subframes having overlapping time with the first subframe, and then the UE separately compares the overlapping time between the z second subframes and the first subframe with the preset threshold, and determines, from the z second subframes, the m second subframes whose overlapping time with the first subframe are greater than the preset threshold or greater than or equal to the preset threshold and that belong to the second base station/second cell group, so that the UE determines the m second channels in the m second subframes, where z≥m≥1, and m and z are positive integers.

It may be understood that, in this embodiment of the present disclosure, the m second channels that are determined by the UE and that have overlapping time with the first channel are obtained by performing screening on all channels having overlapping time with the first channel. If n=m, the UE needs to consider only the m second subframes when allocating power to the first channel, so as to reduce complexity of allocating, by the UE in an asynchronous dual-connectivity scenario, transmit power to an uplink channel that is in the first TAG of the first base station and in an uplink subframe.

S103. The UE allocates transmit power at least to the first channel according to transmit power required for the first channel and transmit power required for the n second channels.

After the UE determines the n second channels in the n second subframes, the UE allocates the transmit power at least to the first channel according to the transmit power required for the first channel and the transmit power required for the n second channels.

Specifically, the UE first determines whether the transmit power required for the first channel and the transmit power required for the n second channels make total transmit power of the UE greater than maximum transmit power of the UE, and when the total transmit power of the UE is greater than the maximum transmit power of the UE, the UE allocates the transmit power at least to the first channel according to a priority of the first channel and priorities of the n second channels.

Further, the transmit power required for the first channel is calculated by the UE according to information such as power control command information and a path loss value, where the power control command information is sent by the first base station or the second base station by using a downlink subframe of the UE. The transmit power required for the n second channels is separately calculated by the UE according to information such as power control command information and path loss values that are of the n channels, where the power control command information is sent by using a downlink subframe of the UE by the first base station or the second base station in which the second TAG is located.

It should be noted that a specific process of allocating, by the UE, the transmit power at least to the first channel according to the transmit power required for the first channel and the transmit power required for the n second channels is described in detail in a subsequent embodiment.

S104. The UE sends data to the first base station/first cell group on the first channel according to the transmit power allocated to the first channel.

After the UE allocates the transmit power to the first channel according to the transmit power required for the first channel and the transmit power required for the n second channels, the UE sends the data to the first base station/first cell group on the first channel according to the transmit power allocated to the first channel, so as to implement communication between the UE and the first base station/first cell group.

It may be understood that when UE allocates power, the power is not allocated between two channels because of an extremely short overlapping time between a first subframe and a second subframe. Instead, the UE performs possible special processing on the extremely short overlapping time between the first subframe and the second subframe, to improve power use efficiency of the UE.

Figure 2:
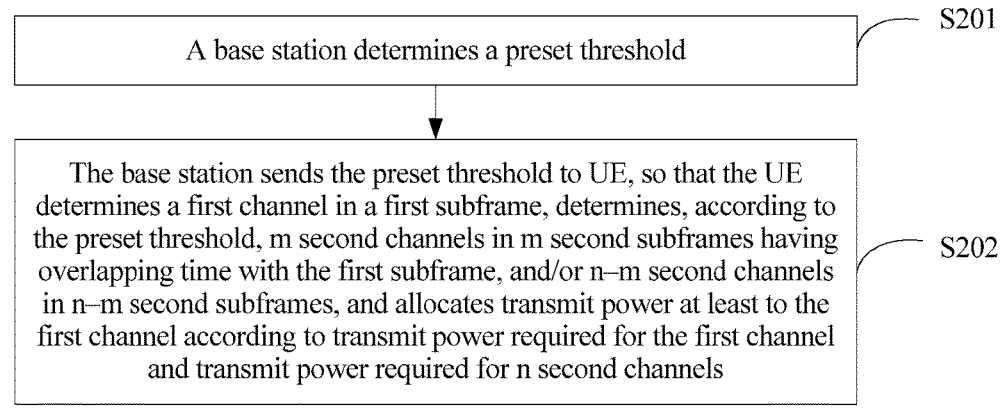
FIG. 2 is a flowchart of another power allocation method according to an embodiment of the present disclosure.

This embodiment of the present disclosure further provides a power allocation method corresponding to a base station side. As shown in FIG. 2, the method may include the following.

S201. A base station determines a preset threshold.

It should be noted that the base station may be a master base station or a secondary base station, and a first channel may be a channel that is in the master base station and in a first subframe, or a channel that is in the secondary base station and in a first subframe.

Exemplarily, the preset threshold is T1, and T1 may be a length of one or more SC-FDMA symbols. A specific preset threshold may be set according to an actual situation, and is not specifically limited in the present disclosure.

S202. The base station sends the preset threshold to UE, so that the UE determines a first channel in a first subframe, determines, according to the preset threshold, m second channels in m second subframes having overlapping time with the first subframe, and/or n−m second channels in n−m second subframes, and allocates transmit power at least to the first channel according to transmit power required for the first channel and transmit power required for n second channels.

After the base station determines the preset threshold, the base station sends the preset threshold to the UE, so that the UE determines the first channel in the first subframe, determines, according to the preset threshold, the m second channels in the m second subframes having the overlapping time with the first subframe, and/or the n−m second channels in the n−m second subframes, and allocates the transmit power at least to the first channel according to the transmit power required for the first channel and the transmit power required for the n second channels.

Exemplarily, the preset threshold may be sent by the master base station to the UE and is used in a process of allocating, by the UE, transmit power to a first channel that is in the secondary base station and in the first subframe.

Optionally, the preset threshold is sent by using the following method: sending the preset threshold by adding the preset threshold to signaling.

This embodiment of the present disclosure provides a power allocation method. UE determines a first channel in a first subframe, where the first channel belongs to a first TAG, and the first TAG is a TAG of a first base station/first cell group. The UE determines n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers. The UE allocates transmit power at least to the first channel according to transmit power required for the first channel and transmit power required for the n second channels. Finally, the UE sends data to the first base station/first cell group on the first channel according to the transmit power allocated to the first channel. In this solution, when allocating the transmit power to the first channel, the UE does not need to consider all channels in second subframes having overlapping time with the first subframe in which the first channel is located, so as to reduce complexity of allocating, by the UE in an asynchronous dual-connectivity scenario, transmit power to an uplink channel that is in a TAG of a base station and in an uplink subframe. The solution is easy for implementation.

Embodiment 2

Figure 3:
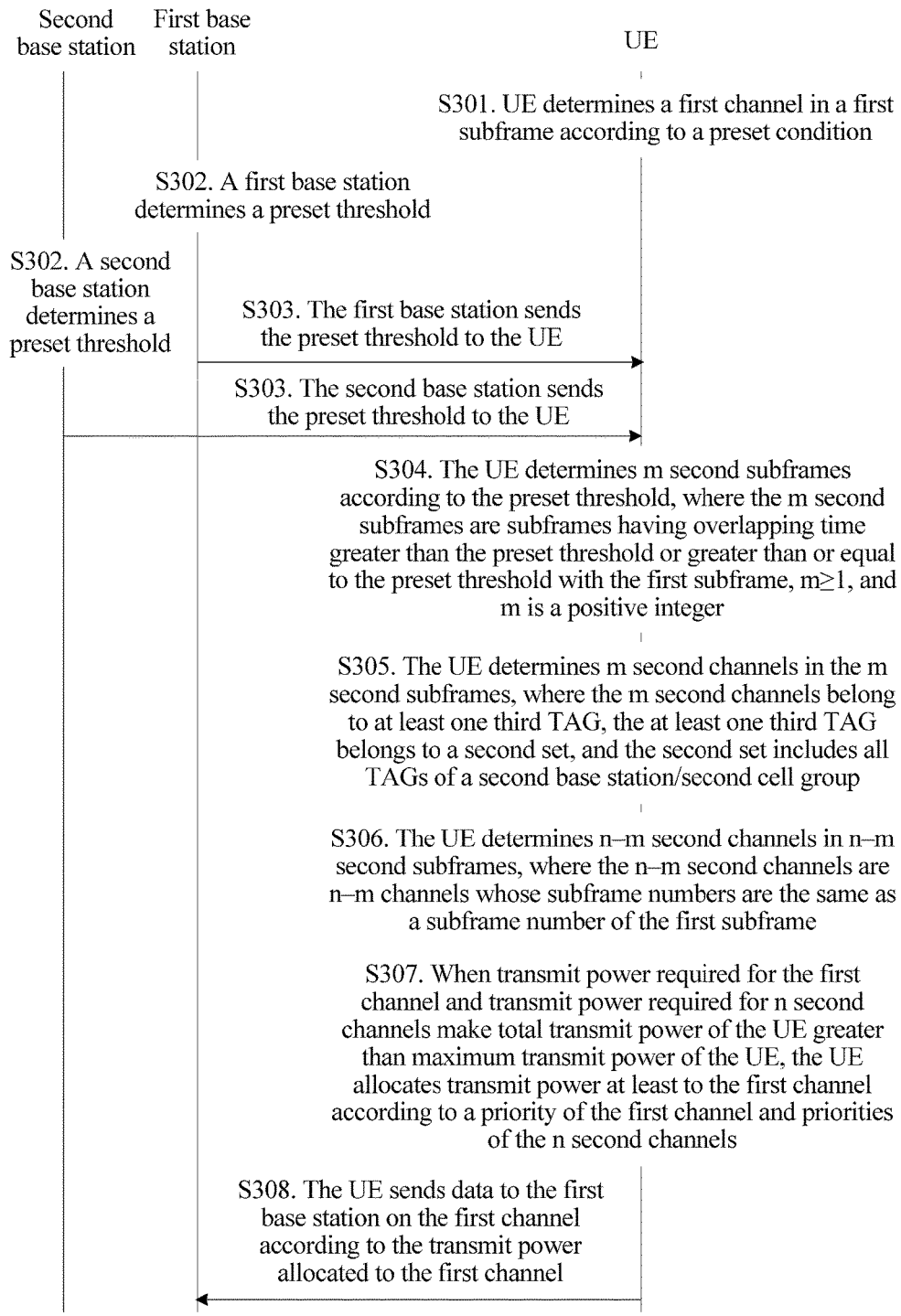
FIG. 3 is an interaction diagram of a power allocation method according to an embodiment of the present disclosure.

This embodiment of the present disclosure provides a power allocation method. As shown in FIG. 3, the method may include the following.

S301. UE determines a first channel in a first subframe according to a preset condition, where the first channel belongs to a first TAG, and the first TAG is a TAG of a first base station/first cell group.

In an asynchronous dual-connectivity scenario, the UE is connected to two base stations to send and receive data, that is, both a master base station and a secondary base station provide a service for the UE. The two base stations are the master base station and the secondary base station. There is any time difference between start moments of downlink subframes of the master base station and the secondary base station, so that there are overlapping time between multiple uplink channels sent by the UE to the master base station and the secondary base station. The overlapping time may be any time difference, that is, a non-fixed value. The power allocation method provided in this embodiment of the present disclosure is a method for allocating transmit power to an uplink channel in the asynchronous dual-connectivity scenario, that is, in this embodiment of the present disclosure, the first channel is an uplink channel, and the first subframe is an uplink subframe.

It should be noted that the master base station or the secondary base station may include one or more cell groups, a cell group of the master base station may be referred to as an MCG, and a cell group of the secondary base station may be referred to as an SCG. In the asynchronous dual-connectivity scenario, the master base station or the secondary base station may separately support four TAGs, and each TAG may have one or more cells that have same uplink timing. The first base station in this embodiment of the present disclosure may be a master base station or a secondary base station, which is not limited in the present disclosure. In addition, the cell group may be replaced with a component carrier group, which is not limited in the present disclosure.

In a TDD-LTE system, one frame includes 10 subframes. In the 10 subframes, some subframes are uplink subframes, some subframes are downlink subframes, and there may also be a special subframe. The special subframe includes both an uplink channel and a downlink channel. In an FDD-LTE system, one uplink radio frame includes 10 uplink subframes, and one downlink radio frame includes 10 downlink subframes. Uplink and downlink are separate in the FDD-LTE system, and different frequencies are used in the uplink and the downlink. A base station sends a downlink channel in a downlink subframe or a special subframe to transmit data to the UE, and the UE sends an uplink channel in an uplink subframe or a special subframe to transmit data to the base station.

In the power allocation method provided in this embodiment of the present disclosure, UE determines a first channel in a first subframe according to a preset condition, where the first channel belongs to a first TAG, the first TAG is a TAG of a first base station/first cell group, and the first base station/first cell group provides a service for the UE.

Specifically, the UE determines, as the first channel according to a priority of a channel that is in the first base station/first cell group and that is in a subframe whose subframe number is the same as that of the first subframe, one of at least one channel that is in the first base station/first cell group and that has a highest priority in the subframe whose subframe number is the same as that of the first subframe; or the UE determines, as the first channel according to a transmission time of a channel that is in the first base station/first cell group and that is in a subframe whose subframe number is the same as that of the first subframe, a channel that is in the first base station/first cell group and that is the first or the last channel transmitted in the subframe whose subframe number is the same as that of the first subframe. A subframe in which the first channel is located is the first subframe, and a TAG in which the first channel is located is the first TAG.

It should be noted that, in one implementation manner, the UE determines, as the first channel according to a priority of a channel that is in the first base station/first cell group and that is in a subframe whose subframe number is the same as that of the first subframe, one of at least one channel that is in the first base station/first cell group and that has the highest priority in the subframe whose subframe number is the same as that of the first subframe.

Exemplarily, it is assumed that the subframe number of the first subframe is i, and in the first base station/first cell group, there are three channels in subframes whose subframe numbers are i: A, B, and C. If priorities of A, B, and C are: A=C>B, that is, priorities of A and C are higher than that of B, the first channel is either A or C. If the first channel is A, the first subframe is a subframe whose subframe number is i and in which A is located.

It may be understood that selecting, by the UE, a channel with a highest power allocation priority as the first channel has an advantage of simplifying the power allocation method. Because a channel with a lower priority in the first base station/first cell group in which the first channel is located does not affect power allocation for the channel with the highest priority in the first base station/first cell group, generally, the UE preferentially considers allocating power to the channel with the highest priority.

It should be noted that, in actual wireless communications, in a case of no physical random access channel (PRACH) channel, channel priorities are: PUCCH>PUSCH carrying UCI>PUSCH carrying no UCI>SRS. The UE preferentially allocates power to a channel with a highest priority, then preferentially allocates power to a remaining channel with a high priority, and then considers allocating power to a channel with a low priority. Each carrier has an upper limit for uplink transmit power. Although channel transmit power of each carrier does not exceed the upper power limit of each carrier, total transmit power of multiple channels may still exceed maximum transmit power configured for the UE. In this case, the UE may preferentially allocate power to the channel with a high priority, and then considers allocating power to the channel with a low priority. If power is not enough to be allocated to the channel with a high priority, no transmit power is allocated to the channel with a low priority. For channels with same priorities or a case in which channel power allocation priorities are not distinguished, if transmit power required for multiple channels exceeds the maximum transmit power of the UE, power scaling is performed.

It should be noted that the channel with the highest power allocation priority may be a channel carrying an acknowledgement (ACK)/negative acknowledge (NACK), such as a PUCCH, or a PUSCH carrying an ACK/a NACK. The channel with the highest power allocation priority refers to a channel with a highest power allocation priority in a channel set, for example, a channel with a highest power allocation priority in all possible channel sets or in a channel set except a channel to which power is allocated.

It should be noted that the manner of selecting a channel with a highest priority in this embodiment of the present disclosure is an exemplary implementable manner, but is not used as a unique implementation manner. A specific highest priority may be set according to an actual situation, and is not limited in the present disclosure.

Optionally, in another implementation manner, the UE determines, as the first channel according to a transmission time of a channel that is in the first base station/first cell group and that is in a subframe whose subframe number is the same as that of the first subframe, a channel that is in the first base station/first cell group and that is the first or the last channel transmitted in the subframe whose subframe number is the same as that of the first subframe.

Exemplarily, it is assumed that the subframe number of the first subframe is i, and in the first base station/first cell group, there are three channels in subframes whose subframe numbers are i: A, B, and C. If transmission time of A, B, and C are: A is transmitted earlier than C, and C is transmitted earlier than B, that is, A is transmitted earlier than B and C, the first channel is A, and the first subframe is a subframe whose subframe number is i and in which A is located. In another example, if transmission time of A, B, and C are: A is transmitted at the same time as C, and A and C are transmitted earlier than B, the first channel is either A or C. If the first channel is C, the first subframe is a subframe whose subframe number is i and in which C is located. In yet another example, if transmission time of A, B, and C are: A is transmitted at the same time as B, and A and B are transmitted later than C, the first channel is either A or B. If the first channel is B, the first subframe is a subframe whose subframe number is i and in which B is located. It should be noted that the preset condition in this embodiment of the present disclosure is an exemplary implementable manner, but is not used as a unique implementation manner. A specific preset condition may also be set according to an actual situation, and is not limited in the present disclosure.

It may be understood that the UE allocates transmit power to an uplink channel after the UE receives, in a downlink subframe, scheduling information of an uplink subframe sent by the first base station or a second base station, and before the UE sends the uplink channel in the uplink subframe to transmit uplink data.

In the power allocation method provided in this embodiment of the present disclosure, when UE allocates power to a first channel, a first subframe in which the first channel is located is used as a reference time segment, and the UE needs to consider a channel in a subframe having an overlapping time with the first subframe in which the first channel is located, that is, a second channel, so as to properly and effectively allocate the power.

It should be noted that, if the first channel may include multiple channels that are in a same TAG and whose subframe numbers are the same, when allocating power to the first channel, the UE also needs to consider these channels that are in the same TAG and whose subframe numbers are the same.

S302. The first base station or a second base station determines a preset threshold.

After the UE determines the first channel in the first subframe according to the preset condition, the first base station or the second base station determines the preset threshold.

Exemplarily, the preset threshold is T1, and T1 may be a length of one or more SC-FDMA symbols. A specific preset threshold may be set according to an actual situation, and is not specifically limited in the present disclosure.

S303. The first base station or the second base station sends the preset threshold to the UE.

After the first base station or the second base station determines the preset threshold, the first base station or the second base station sends the preset threshold to the UE.

It should be noted that a base station that sends the preset threshold and a base station in which the first channel is located may be a same base station, or may be different base stations.

Exemplarily, the preset threshold may be sent by the first base station to the UE and is used in a process of allocating, by the UE, power to a first channel that is in the second base station and in a first subframe.

Optionally, the preset threshold is sent by using the following method: sending the preset threshold by adding the preset threshold to signaling.

It should be noted that the foregoing signaling may be higher layer signaling, that is, the preset threshold is carried in the higher layer signaling for sending.

Optionally, the preset threshold is sent by the first base station or the second base station by using signaling, or is predefined.

Exemplarily, the preset threshold is T1, and T1 may be a length of one or more SC-FDMA symbols. A specific preset threshold may be set according to an actual situation, and is not limited in the present disclosure.

It should be noted that a sequence for performing S301 and S302 is not limited in the present disclosure, that is, S301 may be performed first, and then S302 is performed; S302 may be performed first, and then S301 is performed; or only step S301 is performed when the preset threshold is predefined.

S304. The UE determines m second subframes according to the preset threshold, where the m second subframes are subframes having overlapping time greater than the preset threshold or greater than or equal to the preset threshold with the first subframe, m≥1, and m is a positive integer.

After the first base station or the second base station sends the preset threshold to the UE, or after the UE determines the predefined preset threshold, the UE determines the m second subframes according to the preset threshold, where the m second subframes are the subframes having the overlapping time greater than the preset threshold or greater than or equal to the preset threshold with the first subframe, and m≥1.

Further, before the UE determines the m second subframes according to the preset threshold, where the m second subframes are the subframes having the overlapping time greater than the preset threshold or greater than or equal to the preset threshold with the first subframe, the UE first determines all subframes having overlapping time with the first subframe, and the n subframes are n subframes that are in all the subframes and that have overlapping time greater than the preset threshold or greater than or equal to the preset threshold.

It should be noted that if the first base station is a master base station, the second base station is a secondary base station; if the first base station is a secondary base station, the second base station is a master base station. The first cell group is a cell group of the first base station, and the second cell group is a cell group of the second base station.

Further, different preset thresholds may lead to a difference in power allocation for the first channel when the UE needs to specially process different symbols of a subframe, such as a difference in quantities of symbols that are dropped by the UE or to which no transmit power is allocated. Different channels may be corresponding to different preset thresholds. When the UE allocates power, the UE has same transmit power at least in all symbols in one time segment of one subframe. Generally, first several symbols of a subframe i have same transmit power, and the last one or last several symbols may have different power allocation. A quantity of the last one or last several symbols is cell{T1/Tsymbol}, where ceil is a rounding-up operation, and Tsymbol is a time length that is of an SC-FDMA symbol and that includes a CP length.

Transmit power of the UE is limited in this step. For example, there are overlapping time between the first subframe in which the first channel is located and subframes in which multiple channels are located, where the first channel and the multiple channels belong to a same base station or different base stations. In this way, the UE has the preset threshold T1 to limit the first subframe. For the first subframe, power in a T1 area may not be equal to power in a non-T1 area, and in the non-T1 area, the UE transmits SC-FDMA symbols at same power.

S305. The UE determines m second channels in the m second subframes, where the m second channels belong to at least one third TAG, and the at least one third TAG belongs to all TAGs of a second base station/second cell group.

After the UE determines the m second subframes according to the preset threshold, the UE determines the m second channels in the m second subframes. The m second channels belong to the at least one third TAG, and the at least one third TAG belongs to a second set. The second set includes all the TAGs of the second base station/second cell group, and the second set belongs to a first set. The first set includes a TAG of the first base station/first cell group except the first TAG, and all the TAGs of the second base station/second cell group. The second base station/second cell group provides a service for the UE.

It should be noted that because the m second channels belong to the at least one third TAG, it may be learned that the m second subframes also belong to the at least one third TAG, and the m second channels are separately channels in the m second subframes. There is at least one second channel in one second subframe.

Further, the UE may determine the m second channels according to the preset threshold when an SRS is sent in the last symbol of the first subframe in which the first channel is located, for example, when the first channel is a PUSCH and an SRS signal is sent in the last symbol of the first subframe, or when the first channel is a short-format PUCCH, that is, in this case, no SRS is sent in the last symbol of a subframe in which the PUCCH is located. Although there is an overlapping time between the last symbol of the first subframe and the second subframe in which the second channel is located, if the overlapping time is less than the preset threshold or less than or equal to the preset threshold, for example, does not exceed one symbol, the UE may not send the last symbol of the first subframe. In this way, the second channel does not affect power allocation for the first channel, and therefore, the UE does not consider the second channel when allocating power to the first channel. When the first channel is a PUSCH channel, and transmit power of the last symbol may have different configuration from transmit power of another symbol of the first subframe, the UE determines the m second channels according to the preset threshold. For a second channel that does not meet a threshold requirement, transmit power of the last symbol of the first channel may also be configured and the second channel does not need to be considered. When transmit power of the first symbol of the second channel may have different configuration from power of a symbol of the second subframe in which the second channel is located, the UE may also determine the m second channels according to the preset threshold. For a second subframe that does not meet the threshold requirement, transmit power of the first symbol of a second channel in the second subframe may be configured and the second channel does not need to be considered.

Exemplarily, when the first channel is a long-format PUCCH channel, that is, all SC-FDMA symbols of this subframe are used for the PUCCH channel. In this case, if the second channel is a channel, such as a PUCCH channel, with a power allocation priority that is the same as or higher than that of the first channel PUCCH, the UE does not use a preset threshold T1 for the second channel, that is, provided that there is an overlapping time between the second subframe in which the second channel is located and the first subframe in which the first channel is located, the UE considers the second channel when allocating power to the first channel.

Exemplarily, when the UE determines the m second channels in the m second subframes, the UE first determines z second subframes having overlapping time with the first subframe, and then the UE separately compares the overlapping time between the z second subframes and the first subframe with the preset threshold, and determines, from the z second subframes, the m second subframes whose overlapping time with the first subframe are greater than the preset threshold or greater than or equal to the preset threshold, where z≥m≥1, and m and z are positive integers.

It may be understood that, in this embodiment of the present disclosure, the m second channels that are determined by the UE and that have overlapping time with the first channel are obtained by performing screening on all channels having overlapping time with the first channel. The UE needs to consider only the m second subframes when allocating power to the first channel, so as to reduce complexity of allocating, by the UE in an asynchronous dual-connectivity scenario, transmit power to an uplink channel that is in the first TAG of the first base station and in an uplink subframe.

S306. The UE determines n−m second channels in n−m second subframes, where the n−m second channels are n−m channels whose subframe numbers are the same as a subframe number of the first subframe.

After the UE determines the first channel in the first subframe according to the preset condition, the UE determines the n−m second channels in the n−m second subframes, where the n−m second channels are the n−m channels whose subframe numbers are the same as a subframe number of the first subframe.

After the UE determines the first channel in the first subframe according to the preset condition, the UE determines n second channels in n second subframes, where the n second channels include the m second channels determined in S304 and/or the n−m second channels in S305. Specific composition of the n channels is determined according to an actual situation.

It may be understood that when n=m, n−m=0. In this case, there are no n−m channels whose subframe numbers are the same as that of the first subframe, and therefore, the UE does not consider the n−m channels when allocating power to the first channel. When n>m, n−m>0. In this case, there are the n−m channels whose subframe numbers are the same as a subframe number of the first subframe, and therefore, when allocating power to the first channel, the UE needs to consider the n−m channels and the m channels and allocate power to the n−m channels.

It should be noted that after S301, S302 to S305 are steps parallel to S306. After S301, S302 to S305 may be performed first, and then S306 is performed; or S306 may be performed first, and then S302 to S305 are performed.

S307. When transmit power required for the first channel and transmit power required for n second channels make total transmit power of the UE greater than maximum transmit power of the UE, the UE allocates transmit power at least to the first channel according to a priority of the first channel and priorities of the n second channels.

After the UE determines the m second channels in the m second subframes and the n−m second channels in the n−m second subframes, when the transmit power required for the first channel and the transmit power required for the n second channels make the total transmit power of the UE greater than the maximum transmit power of the UE, the UE allocates the transmit power at least to the first channel according to the priority of the first channel and the priorities of the n second channels.

Further, the transmit power required for the first channel is calculated by the UE according to information such as power control command information and a path loss value, where the power control command information is sent by the first base station or the second base station by using a downlink subframe of the UE. The transmit power required for the n second channels is separately calculated by the UE according to information such as power control command information and path loss values that are of the n channels, where the power control command information is sent by using a downlink subframe of the UE by the first base station or the second base station in which the second TAG is located.

It may be understood that the UE first determines whether the transmit power required for the first channel and the transmit power required for the n second channels make the total transmit power of the UE greater than the maximum transmit power of the UE, and when the total transmit power of the UE is greater than the maximum transmit power of the UE, the UE allocates the transmit power at least to the first channel according to the priority of the first channel and the priorities of the n second channels.

Figure 4:
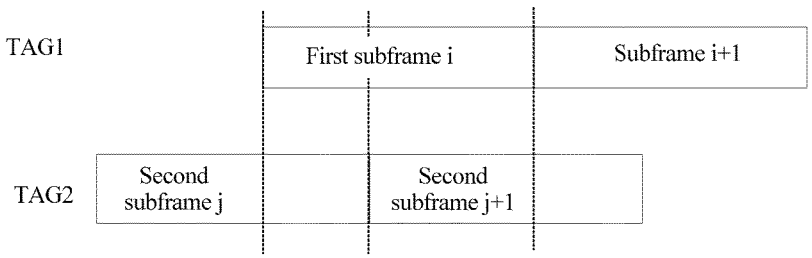
FIG. 4 is a schematic structural diagram 1 of a subframe according to an embodiment of the present disclosure.
Figure 5:
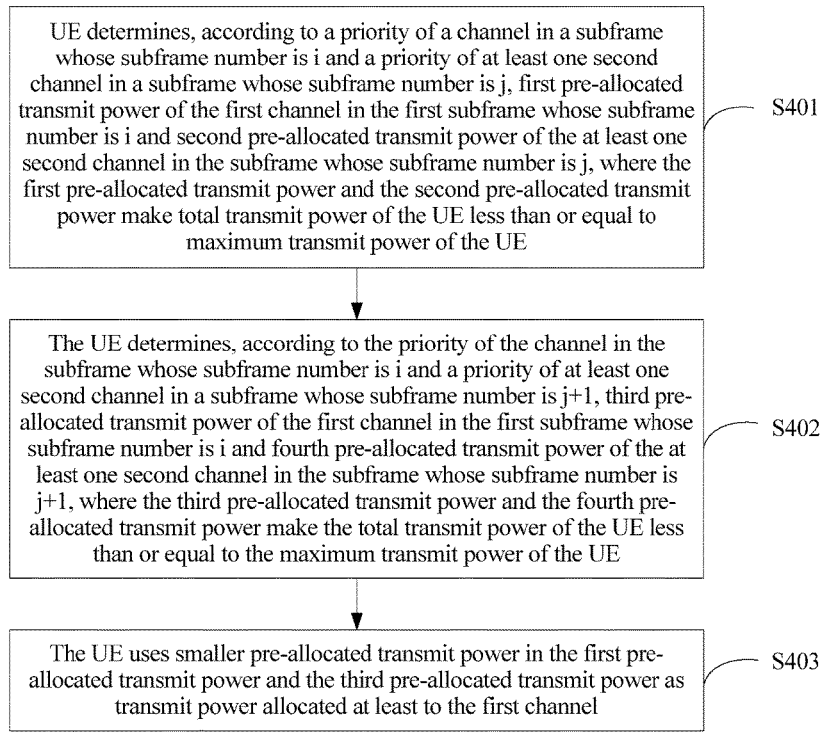
FIG. 5 is a flowchart 2 of a power allocation method according to an embodiment of the present disclosure.

Specifically: (1). When n=m, as shown in FIG. 4, if the subframe number of the first subframe is i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the second subframes whose subframe numbers are j and the second subframe whose subframe number is j+1 belong to the second base station/second cell group, the UE allocates the transmit power at least to the first channel according to the transmit power required for the first channel and the transmit power required for the n second channels. As shown in FIG. 5, details are shown in the following S401 to S403.

It should to be noted that in this specific embodiment, that a start moment of a subframe overlaps the first subframe may be understood as: the first symbol of a second subframe overlaps or partially overlaps the first subframe; and that an end moment of a subframe overlaps the first subframe may be understood as: the last symbol of a second subframe overlaps or partially overlaps the first subframe.

S401. The UE determines, according to a priority of the channel in the subframe whose subframe number is i and a priority of at least one second channel in a subframe whose subframe number is j, first pre-allocated transmit power of the first channel in the first subframe whose subframe number is i and second pre-allocated transmit power of the at least one second channel in the subframe whose subframe number is j, where the first pre-allocated transmit power and the second pre-allocated transmit power make the total transmit power of the UE less than or equal to the maximum transmit power of the UE.

It should be noted that in actual application, values of i and j are integers from 0 to 9. When j+1 is greater than 9, a subframe number of a subframe j+1 is (j+1) mod 10; when i+1 is greater than 9, a subframe number of a subframe i+1 is (i+1) mod 10; when j−1 is less than 0, a subframe number of a subframe j−1 is (j−1) mod 10; and when i−1 is less than 0, a subframe number of a subframe i−1 is (i−1) mod 10.

Specifically, the UE pre-allocates transmit power to a channel with a high channel priority according to the priority of the channel in the subframe whose subframe number is i and the priority of the at least one second channel in the subframe whose subframe number is j. When the priority of the channel in the subframe whose subframe number is i is higher than the priority of the second channel in the subframe whose subframe number is j, the UE first determines pre-allocated transmit power of the channel in the subframe whose subframe number is i, that is, the UE determines the first pre-allocated transmit power of the first channel, and then separately determines second pre-allocated transmit power of the m second channels according to priorities of the m second channels. The first pre-allocated transmit power and the second pre-allocated transmit power make the total transmit power of the UE less than or equal to the maximum transmit power of the UE. The pre-allocated transmit power may include the second pre-allocated transmit power of the at least one second channel in the subframe whose subframe number is j. When the priority of the at least one second channel in the subframe whose subframe number is j is higher than the priority of the channel in the subframe whose subframe number is i and priorities of m−1 second channels, in the subframe whose subframe numbers is j, except the second channel with a high priority, the UE first determines the second pre-allocated transmit power of the second channel with a high priority in the subframe whose subframe number is j, and then determines, according to the priorities of the m−1 second channels and the priority of the channel in the subframe whose subframe number is i, the first pre-allocated transmit power of the first channel in the subframe whose subframe number is i and separately determines second pre-allocated transmit power of the m−1 second channels. The first pre-allocated transmit power and the second pre-allocated transmit power make the total transmit power of the UE less than or equal to the maximum transmit power of the UE.

It should be noted that when the UE allocates transmit power to the first channel and the m second channels, a part of transmit power that is of the UE and in a first subframe segment may be occupied by another channel. Therefore, after the UE allocates the first pre-allocated transmit power and the second pre-allocated transmit power to the first channel and the m second channels, the first pre-allocated transmit power, the second pre-allocated transmit power, and the occupied part of transmit power need to be less than or equal to the maximum transmit power of the UE, that is, the first pre-allocated transmit power and the second pre-allocated transmit power make the total transmit power of the UE less than or equal to the maximum transmit power of the UE.

It should be noted that when the UE pre-allocates transmit power to channels with same priorities, the UE may scale transmit power required for the foregoing channels with the same priorities in proportion, and then allocate the scaled transmit power to the channels with the same priorities.

S402. The UE determines, according to the priority of the channel in the subframe whose subframe number is i and a priority of at least one second channel in a subframe whose subframe number is j+1, third pre-allocated transmit power of the first channel in the first subframe whose subframe number is i and fourth pre-allocated transmit power of the at least one second channel in the subframe whose subframe number is j+1, where the third pre-allocated transmit power and the fourth pre-allocated transmit power make the total transmit power of the UE less than or equal to the maximum transmit power of the UE.

After the UE determines, according to the priority of the channel in the subframe whose subframe number is i and the priority of the at least one second channel in the subframe whose subframe number is j, the first pre-allocated transmit power of the first channel in the first subframe whose subframe number is i and the second pre-allocated transmit power of the at least one second channel in the subframe whose subframe number is j, the UE determines, according to the priority of the channel in the subframe whose subframe number is i and the priority of the at least one second channel in the subframe whose subframe number is j+1, the third pre-allocated transmit power of the first channel in the first subframe whose subframe number is i and the fourth pre-allocated transmit power of the at least one second channel in the subframe whose subframe number is j+1. The third pre-allocated transmit power and the fourth pre-allocated transmit power make the total transmit power of the UE less than or equal to the maximum transmit power of the UE.

It should be noted that a process of determining, by the UE according to the priority of the channel in the subframe whose subframe number is i and the priority of the at least one second channel in the subframe whose subframe number is j+1, the third pre-allocated transmit power of the first channel in the first subframe whose subframe number is i and the fourth pre-allocated transmit power of the at least one second channel in the subframe whose subframe number is j+1 is similar to that of determining, by the UE according to the priority of the channel in the subframe whose subframe number is i and the priority of the at least one second channel in the subframe whose subframe number is j, the first pre-allocated transmit power of the first channel in the first subframe whose subframe number is i and the second pre-allocated transmit power of the at least one second channel in the subframe whose subframe number is j, and is not described herein again.

Optionally, the priority of the at least one second channel in the subframe whose subframe number is j+1 is higher than or equal to the priority of the first channel in the first subframe whose subframe number is i, and/or the priority of the at least one second channel in the subframe whose subframe number is j+1 is higher than a priority of a channel in a subframe whose subframe number is i+1. The channel in the subframe whose subframe number is i+1 is a channel in a next subframe of the first subframe whose subframe number is i.

It should be noted that a sequence for performing S401 and S402 is not limited in this embodiment of the present disclosure, that is, S401 may be performed first, and then S402 is performed; or S402 may be performed first, and then S401 is performed, which is not limited in the present disclosure.

S403. The UE uses smaller pre-allocated transmit power in the first pre-allocated transmit power and the third pre-allocated transmit power as the transmit power allocated at least to the first channel.

After the UE determines, according to the priority of the channel in the subframe whose subframe number is i and the priority of the at least one second channel in the subframe whose subframe number is j+1, the third pre-allocated transmit power of the first channel in the first subframe whose subframe number is i and the fourth pre-allocated transmit power of the at least one second channel in the subframe whose subframe number is j+1, the UE uses the smaller pre-allocated transmit power in the first pre-allocated transmit power and the third pre-allocated transmit power as the transmit power allocated at least to the first channel.

Exemplarily, it is assumed that the first pre-allocated transmit power is 10 watts, and the third pre-allocated transmit power is 8 watts. Because 8 watts is less than 10 watts, the UE allocates transmit power of 8 watts to the first channel.

(2). When n>m, as shown in FIG. 6, if the subframe number of the first subframe is i, there are the n−m second subframes whose subframe numbers are i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the n−m second subframes whose subframe numbers are i and the first subframe whose subframe number is i belong to the first base station/the first cell group, and the second subframes whose subframe numbers are j and the second subframe whose subframe number is j+1 belong to the second base station/second cell group, the UE allocates transmit power at least to the first channel and the n−m second subframes according to the transmit power required for the first channel and the transmit power required for the n second channels. As shown in FIG. 7, details are shown in the following: S501 to S503.

S501. The UE determines, according to priorities of channels in subframes whose subframe numbers are i and a priority of at least one second channel in subframes whose subframe numbers are j, first pre-allocated transmit power of the first channel in the first subframe whose subframe number is i and second pre-allocated transmit power of at least one second channel in second subframes whose subframe numbers are i and the at least one second channel in the subframes whose subframe numbers are j, where the first pre-allocated transmit power and the second pre-allocated transmit power make the total transmit power of the UE less than or equal to the maximum transmit power of the UE.

It should be noted that when the UE actually performs data transmission with a base station, because downlink subframes of a same base station are synchronous, a start moment difference of uplink subframes in TAGs of a same base station or a same cell group is extremely small, for example, less than 32.47 microseconds. For example, as shown in FIG. 6, subframes with a start moment difference less than 32.47 microseconds may have a same subframe number. Therefore, a subframe number of a subframe in which a second channel in the n second channels is located is i, where the second channel belongs to the first base station/first cell group and overlaps the first channel in the first subframe whose subframe number is i.

Specifically, the UE pre-allocates transmit power to a channel with a high channel priority according to the priority of the channel in the subframes whose subframe numbers are i and the priority of the at least one second channel in the subframes whose subframe numbers are j. When the priority of the first channel in the subframe whose subframe number is i is higher than priorities of m second channels in the subframes whose subframe numbers are j and n−m second channels in the subframes whose subframe numbers are i, the UE first determines pre-allocated power of the first channel in the subframe whose subframe number is i. In this case, because the first channel determined in an embodiment of the present disclosure is a channel with a highest priority in channels in the subframes whose subframe numbers are i, the UE determines the first pre-allocated transmit power of the first channel, and then separately allocates second pre-allocated transmit power to the n second channels according to priorities of the n second channels. The first pre-allocated transmit power and the second pre-allocated transmit power make the total transmit power of the UE less than or equal to the maximum transmit power of the UE. The second pre-allocated transmit power may include pre-allocated transmit power of at least one second channel of the m second channels in the subframes whose subframe numbers are j and pre-allocated transmit power of at least one second channel of the n−m second channels in the subframes whose subframe numbers are i. When a priority of a second channel in the m second channels in the subframes whose subframe numbers are j is higher than priorities of the channels in all the subframes whose subframe numbers are i and priorities of m−1 second channels, in the m second channels in the subframes whose subframe numbers are j, except the second channel with a high priority, the UE first determines second pre-allocated transmit power of the second channel with a high priority in the m second channels in the subframes whose subframe numbers are j, and then determines, according to the priorities of the m−1 second channels and the priorities of the channels in the subframes whose subframe numbers are i, the first pre-allocated transmit power of the first channel in the subframe whose subframe number is i, pre-allocated transmit power of the at least one second channel in the subframes whose subframe numbers are i, and pre-allocated transmit power of at least one second channel of the m−1 second channels in the subframes whose subframe numbers are j. The pre-allocated transmit power of the second channel in the subframes whose subframe numbers are j and the pre-allocated transmit power of the second channel in the subframes whose subframe numbers are i are referred to as the second pre-allocated transmit power. The first pre-allocated transmit power and the second pre-allocated transmit power make the total transmit power of the UE less than or equal to the maximum transmit power of the UE.

It should be noted that when the UE pre-allocates transmit power to channels with same priorities, the UE may scale transmit power required for the foregoing channels with the same priorities in proportion, and then allocate the scaled transmit power to the channels with the same priorities.

S502. The UE determines, according to the priorities of the channels in the subframes whose subframe numbers are i and a priority of at least one second channel in the subframe whose subframe number is j+1, third pre-allocated transmit power of the first channel in the first subframe whose subframe number is i and fourth pre-allocated transmit power of the at least one second channel in the second subframes whose subframe numbers are i and the at least one second channel in the subframe whose subframe number is j, where the third pre-allocated transmit power and the fourth pre-allocated transmit power make the total transmit power of the UE less than or equal to the maximum transmit power of the UE.

S503. The UE uses smaller pre-allocated transmit power in the first pre-allocated transmit power and the third pre-allocated transmit power as the transmit power allocated at least to the first channel.

S308. The UE sends data to the first base station on the first channel according to the transmit power allocated to the first channel.

When the transmit power required for the first channel and the transmit power required for the n second channels make the total transmit power of the UE greater than the maximum transmit power of the UE, after the UE allocates the transmit power at least to the first channel according to the priority of the first channel and the priorities of the n second channels, the UE sends the data to the first base station/first cell group on the first channel according to the transmit power allocated to the first channel, so as to implement communication between the UE and the first base station/first cell group.

This embodiment of the present disclosure provides a power allocation method. UE determines a first channel in a first subframe, where the first channel belongs to a first TAG, and the first TAG is a TAG of a first base station/first cell group. The UE determines n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers. The UE allocates transmit power at least to the first channel according to transmit power required for the first channel and transmit power required for the n second channels. Finally, the UE sends data to the first base station/first cell group on the first channel according to the transmit power allocated to the first channel. In this solution, when allocating the transmit power to the first channel, the UE does not need to consider all channels in second subframes having overlapping time with the first subframe in which the first channel is located, so as to reduce complexity of allocating, by the UE in an asynchronous dual-connectivity scenario, transmit power to an uplink channel that is in a TAG of a base station and in an uplink subframe. The solution is easy for implementation.

Embodiment 3

Figure 8:
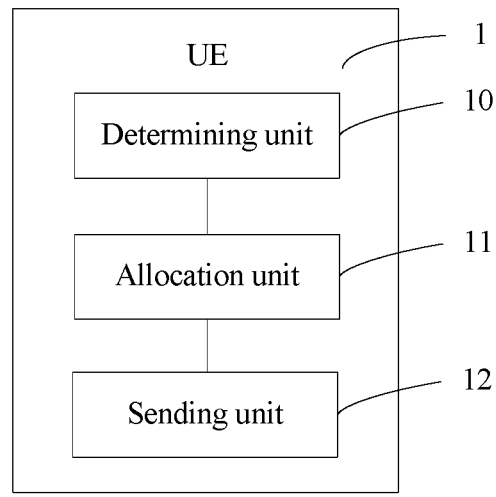
FIG. 8 is a schematic structural diagram 1 of UE according to an embodiment of the present disclosure.

As shown in FIG. 8, this embodiment of the present disclosure provides UE 1 corresponding to a power allocation method on a UE side. The UE 1 may include a determining unit 10 configured to determine a first channel in a first subframe, where the first channel belongs to a first TAG, and the first TAG is a TAG of a first base station/first cell group; where the determining unit 10 is further configured to determine n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers; an allocation unit 11 configured to allocate transmit power at least to the first channel according to transmit power required for the first channel determined by the determining unit 10 and transmit power required for the n second channels determined by the determining unit 10; and a sending unit 12 configured to send data to the first base station/first cell group on the first channel according to the transmit power allocated to the first channel by the allocation unit 11.

Optionally, the allocation unit 11 is specifically configured to allocate, according to a priority of the first channel determined by the determining unit 10 and priorities of the n second channels determined by the determining unit 10, the transmit power at least to the first channel when the transmit power required for the first channel determined by the determining unit 10 and the transmit power required for the n second channels determined by the determining unit 10 make total transmit power of the UE greater than maximum transmit power of the UE.

Optionally, if the subframe number of the first subframe is i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the second subframes whose subframe numbers are j and the second subframe whose subframe number is j+1 belong to the second base station/second cell group, the determining unit 10 is specifically configured to: determine, according to a priority of the channel in the subframe whose subframe number is i and a priority of at least one second channel in the subframes whose subframe numbers are j, first pre-allocated transmit power of the first channel in the first subframe whose subframe number is i and second pre-allocated transmit power of the at least one second channel in the subframes whose subframe numbers are j, where the first pre-allocated transmit power and the second pre-allocated transmit power make the total transmit power of the UE less than or equal to the maximum transmit power of the UE; and determine, according to the priority of the channel in the subframe whose subframe number is i and a priority of at least one second channel in the subframe whose subframe number is j+1, third pre-allocated transmit power of the first channel in the first subframe whose subframe number is i and fourth pre-allocated transmit power of the at least one second channel in the subframe whose subframe number is j+1, where the third pre-allocated transmit power and the fourth pre-allocated transmit power make the total transmit power of the UE less than or equal to the maximum transmit power of the UE; and the allocation unit 11 is further specifically configured to use, as the transmit power allocated at least to the first channel, smaller pre-allocated transmit power in the first pre-allocated transmit power and the third pre-allocated transmit power that are determined by the determining unit 10.

Optionally, the priority of the at least one second channel that is determined by the determining unit 10 and that is in the subframe whose subframe number is j+1 is higher than or equal to the priority of the first channel in the first subframe whose subframe number is i, and/or the priority of the at least one second channel in the subframe whose subframe number is j+1 is higher than a priority of a channel in a subframe whose subframe number is i+1, where the channel in the subframe whose subframe number is i+1 is a channel in a next subframe of the first subframe whose subframe number is i.

Optionally, the determining unit 10 is further specifically configured to determine the first channel in the first subframe according to a preset condition.

Optionally, the preset condition includes a priority of a channel that is in the first base station/first cell group and that is in a subframe whose subframe number is the same as that of the first subframe; or a transmission time of a channel that is in the first base station/first cell group and that is in a subframe whose subframe number is the same as that of the first subframe.

The determining unit 10 is further specifically configured to: determine, as the first channel according to the priority of the channel that is in the first base station/first cell group and that is in the subframe whose subframe number is the same as that of the first subframe, one of at least one channel that is in the first base station/first cell group and that has a highest priority in the subframe whose subframe number is the same as that of the first subframe; or determine, as the first channel according to the transmission time of the channel that is in the first base station/first cell group and that is in the subframe whose subframe number is the same as that of the first subframe, a channel that is in the first base station/first cell group and that is the first or the last channel transmitted in the subframe whose subframe number is the same as that of the first subframe, where a subframe in which the first channel is located is the first subframe, and a TAG in which the first channel is located is the first TAG.

Optionally, the preset threshold is sent by the first base station or the second base station by using signaling, or is predefined.

This embodiment of the present disclosure provides UE. The UE determines a first channel in a first subframe, where the first channel belongs to a first TAG, and the first TAG is a TAG of a first base station/first cell group. The UE determines n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers. The UE allocates transmit power at least to the first channel according to transmit power required for the first channel and transmit power required for the n second channels. Finally, the UE sends data to the first base station/first cell group on the first channel according to the transmit power allocated to the first channel. In this solution, when allocating the transmit power to the first channel, the UE does not need to consider all channels in second subframes having overlapping time with the first subframe in which the first channel is located, so as to reduce complexity of allocating, by the UE in an asynchronous dual-connectivity scenario, transmit power to an uplink channel that is in a TAG of a base station and in an uplink subframe. The solution is easy for implementation.

Figure 9:
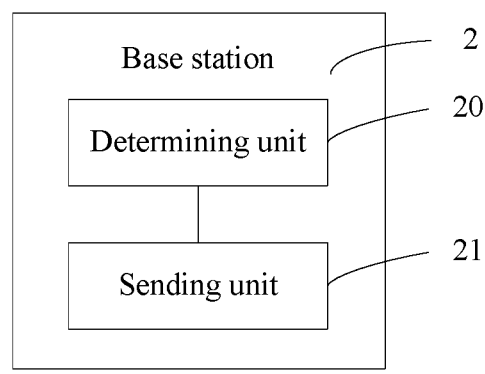
FIG. 9 is a schematic structural diagram 1 of a base station according to an embodiment of the present disclosure.

As shown in FIG. 9, this embodiment of the present disclosure provides a base station 2 corresponding to a power allocation method on a base station side. The base station 2 may include a determining unit 20 configured to determine a preset threshold; and a sending unit 21 configured to send the preset threshold determined by the determining unit 20 to UE, so that the UE determines a first channel in a first subframe, determines, according to the preset threshold, m second channels in m second subframes having overlapping time with the first subframe, and/or n−m second channels in n−m second subframes, and allocates transmit power at least to the first channel according to transmit power required for the first channel and transmit power required for n second channels.

Optionally, the preset threshold is carried in signaling for sending.

This embodiment of the present disclosure provides a base station. The base station determines a preset threshold, and sends the preset threshold to UE, so that the UE determines a first channel in a first subframe, determines, according to the preset threshold, m second channels in m second subframes having overlapping time with the first subframe, and/or n−m second channels in n−m second subframes, and allocates transmit power at least to the first channel according to transmit power required for the first channel and transmit power required for n second channels. In this solution, the base station sends the preset threshold to the UE, so that when allocating the transmit power to the first channel, the UE does not need to consider all channels in second subframes having overlapping time with the first subframe in which the first channel is located, so as to reduce complexity of allocating, by the UE in an asynchronous dual-connectivity scenario, transmit power to an uplink channel that is in a TAG of a base station and in an uplink subframe. The solution is easy for implementation.

Embodiment 4

Figure 10:
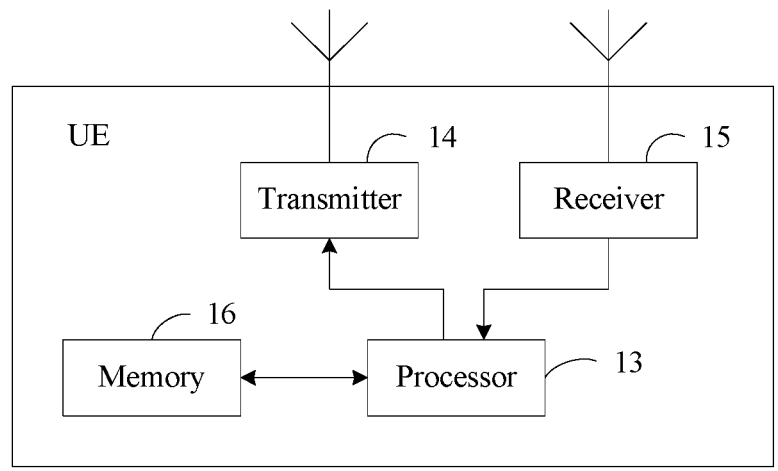
FIG. 10 is a schematic structural diagram 2 of UE according to an embodiment of the present disclosure.

As shown in FIG. 10, this embodiment of the present disclosure provides UE corresponding to a power allocation method on a UE side. The UE may include a processor 13, a transmitter 14, a receiver 15, and a memory 16. The transmitter 14, the receiver 15, and the memory 16 are connected to the processor 13. For example, the transmitter 14, the receiver 15, and the memory 16 may be connected to the processor 13 by using a bus.

The receiver 15 and the transmitter 14 may be integrated to constitute a transceiver.

The processor 13 may be a central processing unit or an application-specific integrated circuit (ASIC); or is configured as one or more integrated circuits (ICs) for implementing this embodiment of the present disclosure.

The processor 13 is a control center of the UE; the processor 13 is connected to parts of the entire UE by using various interfaces and lines, and is configured to implement various functions of the UE or process data by running or executing a software program and/or a module that are/is stored in the memory 16 and invoking data stored in the memory 16. The processor 13 may include an IC. For example, the processor 13 may include a single packaged IC, or may be formed by connecting multiple packaged ICs having a same function or different functions.

The memory 16 may be configured to store a software program and a module, and the processor 13 is configured to implement various functional applications of a communications device and process data by running the software program and the module that are stored in the memory 16. The memory 16 mainly includes a program storage area and a data storage area. The program storage area may be configured to store an operating system, an application program such as a sound playing program or an image playing program that is required for at least one function. The data storage area may be configured to store data (such as audio data or a phonebook) that is created according to use of an electronic device, and the like.

Specifically, the processor 13 may be configured to: determine a first channel in a first subframe, where the first channel belongs to a first TAG, and the first TAG is a TAG of a first base station/first cell group; determine n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers; and allocate transmit power at least to the first channel according to transmit power required for the first channel and transmit power required for the n second channels. The transmitter 14 may be configured to send data to the first base station/first cell group on the first channel according to the transmit power allocated to the first channel by the processor 13. The receiver 15 may be configured to receive data, scheduling information, and the like that are sent by the base station. The memory 16 may be configured to: store software code of the first channel, software code of the n second channels, the first pre-allocated transmit power, and the second pre-allocated transmit power, and control the UE to complete a software program of the foregoing process, so that the processor 13 completes the foregoing process by executing the foregoing software program and invoking the foregoing software code.

Optionally, the processor 13 is specifically configured to allocate the transmit power at least to the first channel according to a priority of the first channel and priorities of the n second channels when the transmit power required for the first channel and the transmit power required for the n second channels make total transmit power of the UE greater than maximum transmit power of the UE.

Optionally, if the subframe number of the first subframe is i, subframe numbers of all second subframes that are in the m second subframes and whose end moments overlap an end moment of the first subframe are j, and a subframe number of a second subframe that is in the m second subframes and whose start moment overlaps a start moment of the first subframe is j+1, where the second subframes whose subframe numbers are j and the second subframe whose subframe number is j+1 belong to the second base station/second cell group, the processor 13 is further specifically configured to: determine, according to a priority of the channel in the subframe whose subframe number is i and a priority of at least one second channel in the subframes whose subframe numbers are j, first pre-allocated transmit power of the first channel in the first subframe whose subframe number is i and second pre-allocated transmit power of the at least one second channel in the subframes whose subframe numbers are j, where the first pre-allocated transmit power and the second pre-allocated transmit power make the total transmit power of the UE less than or equal to the maximum transmit power of the UE; determine, according to the priority of the channel in the subframe whose subframe number is i and a priority of at least one second channel in the subframe whose subframe number is j+1, third pre-allocated transmit power of the first channel in the first subframe whose subframe number is i and fourth pre-allocated transmit power of the at least one second channel in the subframe whose subframe number is j+1, where the third pre-allocated transmit power and the fourth pre-allocated transmit power make the total transmit power of the UE less than or equal to the maximum transmit power of the UE; and use smaller pre-allocated transmit power in the first pre-allocated transmit power and the third pre-allocated transmit power as the transmit power allocated at least to the first channel.

Optionally, the priority of the at least one second channel that is determined by the processor and that is in the subframe whose subframe number is j+1 is higher than or equal to the priority of the first channel in the first subframe whose subframe number is i, and/or the priority of the at least one second channel in the subframe whose subframe number is j+1 is higher than a priority of a channel in a subframe whose subframe number is i+1, where the channel in the subframe whose subframe number is i+1 is a channel in a next subframe of the first subframe whose subframe number is i.

Optionally, the processor 13 is further specifically configured to determine the first channel in the first subframe according to a preset condition.

Optionally, the preset condition includes a priority of a channel that is in the first base station/first cell group and that is in a subframe whose subframe number is the same as that of the first subframe; or a transmission time of a channel that is in the first base station/first cell group and that is in a subframe whose subframe number is the same as that of the first subframe.

The processor 13 is further specifically configured to: determine, as the first channel according to the priority of the channel that is in the first base station/first cell group and that is in the subframe whose subframe number is the same as that of the first subframe, one of at least one channel that is in the first base station/first cell group and that has a highest priority in the subframe whose subframe number is the same as that of the first subframe; or determine, as the first channel according to the transmission time of the channel that is in the first base station/first cell group and that is in the subframe whose subframe number is the same as that of the first subframe, a channel that is in the first base station/first cell group and that is the first or the last channel transmitted in the subframe whose subframe number is the same as that of the first subframe, where a subframe in which the first channel is located is the first subframe, and a TAG in which the first channel is located is the first TAG.

Optionally, the preset threshold is sent by the first base station or the second base station by using signaling, or is predefined.

This embodiment of the present disclosure provides UE. The UE determines a first channel in a first subframe, where the first channel belongs to a first TAG, and the first TAG is a TAG of a first base station/first cell group. The UE determines n second channels in n second subframes, where the n second channels include m second channels in m second subframes of the n second subframes, and/or n−m second channels whose subframe numbers are the same as a subframe number of the first subframe, the m second subframes are subframes having overlapping time greater than a preset threshold or greater than or equal to a preset threshold with the first subframe, the n second channels belong to at least one second TAG, the at least one second TAG belongs to a first set, the first set includes a TAG of the first base station/first cell group except the first TAG, and all TAGs of a second base station/second cell group, n≥m≥1, and m and n are positive integers. The UE allocates transmit power at least to the first channel according to transmit power required for the first channel and transmit power required for the n second channels. Finally, the UE sends data to the first base station/first cell group on the first channel according to the transmit power allocated to the first channel. In this solution, when allocating the transmit power to the first channel, the UE does not need to consider all channels in second subframes having overlapping time with the first subframe in which the first channel is located, so as to reduce complexity of allocating, by the UE in an asynchronous dual-connectivity scenario, transmit power to an uplink channel that is in a TAG of a base station and in an uplink subframe. The solution is easy for implementation.

Figure 11:
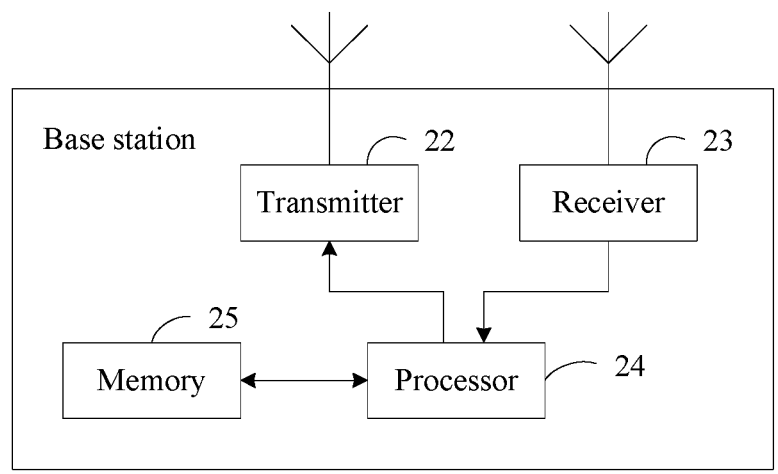
FIG. 11 is a schematic structural diagram 2 of a base station according to an embodiment of the present disclosure.

As shown in FIG. 11, this embodiment of the present disclosure provides a base station corresponding to a power allocation method on a base station side. The base station may include a transmitter 22, a receiver 23, a processor 24, and a memory 25. The transmitter 22, the receiver 23, and the memory 25 are connected to the processor 24. For example, the transmitter 22, the receiver 23, and the memory 25 may be connected to the processor 24 by using a bus.

The receiver 23 and the transmitter 22 may be integrated to constitute a transceiver.

The processor 24 may be a central processing unit or an ASIC; or is configured as one or more ICs for implementing this embodiment of the present disclosure.

The memory 25 may be configured to store executable program code, where the program code includes computer operation instructions. The memory 25 may include a high-speed random-access memory (RAM) and may also include a non-volatile memory, for example, at least one disk memory.

Specifically, the processor 24 may be configured to determine a preset threshold. The transmitter 22 may be configured to send the preset threshold determined by the processor 24 to UE, so that the UE determines a first channel in a first subframe, determines, according to the preset threshold, m second channels in m second subframes having overlapping time with the first subframe, and/or n−m second channels in n−m second subframes, and allocates transmit power at least to the first channel according to transmit power required for the first channel and transmit power required for n second channels. The receiver 23 may be configured to receive data sent by the UE. The memory 25 may be configured to store the preset threshold and software code of the preset threshold, and control the base station to complete a software program of the foregoing process, so that the processor 24 is configured to complete the foregoing process by executing the foregoing software program and invoking the foregoing software code.

Optionally, the preset threshold is carried in signaling for sending.

This embodiment of the present disclosure provides a base station. The base station determines a preset threshold, and sends the preset threshold to UE, so that the UE determines a first channel in a first subframe, determines, according to the preset threshold, m second channels in m second subframes having overlapping time with the first subframe, and/or n–m second channels in n–m second subframes, and allocates transmit power at least to the first channel according to transmit power required for the first channel and transmit power required for n second channels. In this solution, the base station sends the preset threshold to the UE, so that when allocating the transmit power to the first channel, the UE does not need to consider all channels in second subframes having overlapping time with the first subframe in which the first channel is located, so as to reduce complexity of allocating, by the UE in an asynchronous dual-connectivity scenario, transmit power to an uplink channel that is in a TAG of a base station and in an uplink subframe. The solution is easy for implementation.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially or all or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a Universal Serial Bus (USB) flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power allocation method implemented by a user equipment (UE) and comprising:
   determining a first channel in a first subframe, the first channel belonging to a first timing advance group (TAG) of a first cell group, the first subframe having a first subframe number;
   determining n second channels in n second subframes, the n second channels comprising m second channels in m second subframes and n–m second channels in n–m second subframes, the n–m second subframes having second subframe numbers that are the same as the first subframe number, the m second subframes having, with the first subframe, an overlapping time greater than or equal to a preset threshold, the second channels belonging to at least one second TAG of a first set, the first set comprising a TAG of the first cell group that is not the first TAG and all TAGs of a second cell group, $n \geq m \geq 1$, and m and n being positive integers;
   allocating a transmit power to the first channel according to a first required transmit power required for the first channel and a second required transmit power required for the n second channels; and
   sending data to the first cell group on the first channel according to the transmit power.

2. The power allocation method of claim 1, wherein the m second channels do not affect power allocation for the first channel when the overlapping time is less than a second preset threshold.

3. The power allocation method of claim 1, wherein the transmit power is allocated to the first channel further according to a first channel priority and priorities of the n second channels when the first required transmit power and the second required transmit power make a total transmit power of the UE greater than a maximum transmit power of the UE.

4. The power allocation method of claim 3, wherein when the first subframe number is i, the second subframe numbers of the m second subframes and whose end moments overlap an end moment of the first subframe are j, and the second subframe number of one of the m second subframes and whose start moment overlaps a start moment of the first subframe is j+1, the second subframes whose second subframe numbers are j and the second subframe whose second subframe number is j+1 belong to the second cell group, allocating transmit power at least to the first channel according to transmit power required for the first channel and transmit power required for the n second channels comprises:
  determining, by the UE according to the first channel priority of the first subframe whose first subframe number is i and a second channel priority of the second subframes whose second subframe numbers are j, a first pro-allocated transmit power of the first channel in the first subframe whose first subframe number is i and a second pre-allocated transmit power of the second channel in the second subframes whose second subframe numbers are j, the first pre-allocated transmit power and the second pre-allocated transmit power making the total transmit power of the UE less than or equal to the maximum transmit power of the UE;
  determining, by the UE according to the first channel priority of the first subframe whose first subframe number is i and the second channel priority of the second subframe whose second subframe number is j+1, third pre-allocated transmit power of the first channel in the first subframe whose first subframe number is i and a fourth pre-allocated transmit power of the second channel in the second subframe whose second subframe number is j+1, the third pre-allocated transmit power and the fourth pre-allocated transmit power making the total transmit power of the UE less than or equal to the maximum transmit power of the UE; and
  using, by the UE, smaller pro-allocated transmit power in the first pre-allocated transmit power and the third pre-allocated transmit power as the transmit power allocated at least to the first channel.

5. The power allocation method of claim 4, wherein the second channel priority of the second subframe whose second subframe number is j+1 is higher than or equal to the first channel priority of the first subframe whose first subframe number is i, the second channel priority of the second subframe whose second subframe number is j+1 is higher than a channel priority of a channel of a subframe whose subframe number is i+1, and the channel in the subframe whose subframe number is i+1 is a channel in a next subframe of the first subframe whose first subframe number is i.

6. The power allocation method of claim 1, wherein the first channel in the first subframe is determined according to a preset condition.

7. The power allocation method of claim 6, wherein the preset condition comprises a channel priority of a channel that is in the first cell group and that is in a subframe whose subframe number is the same as that of the first subframe, or a transmission time of a channel that is in the first cell group and that is in a subframe whose subframe number is the same as that of the first subframe.

8. The power allocation method of claim 7, wherein determining the first channel that is in the first TAG and in the first subframe comprises:
  determining, by the UE as the first channel according to a first channel priority that is in the first cell group and that is in the first subframe whose subframe number is the same as that of the first subframe, one of at least one channel that is in the first cell group and that has a highest priority of the first subframe whose subframe number is the same as that of the first subframe; or
  determining, by the UE as the first channel according to the transmission time of the first channel that is in the first cell group and that is in the first subframe whose subframe number is the same as that of the first subframe, a channel that is in the first cell group and that is the first channel or a last channel transmitted in the subframe whose subframe number is the same as that of the first subframe, a subframe in which the first channel is located being the first subframe, and the first channel being located in the first TAG.

9. The power allocation method of claim 1, wherein the preset threshold is received from a first base station corresponding to the first cell group, received from a second base station corresponding to a second cell group, or is predefined.

10. A user equipment (UE) comprising:
  a processor configured to:
    determine a first channel in a first subframe, the first channel belonging to a first timing advance group (TAG) of a first cell group, and the first subframe having a first subframe number,
    determine n second channels in n second subframes, the n second channels comprising m second channels in m second subframes and n−m second channels in n−m second subframes, the n−m second subframes having second subframe numbers that are the same as the first subframe number, the m second subframes having, with the first subframe, an overlapping time greater than or equal to a preset threshold, the second channels belonging to at least one second TAG of a first set, the first set comprising a TAG of the first cell group that is not the first TAG and all TAGs ofa second cell group, n≥m≥1, and m and n being positive integers; and
    allocate a transmit power at least to the first channel according to a first required transmit power required for the first channel and a second required transmit power required for the n second channels; and
  a transmitter coupled to the processor and configured to send data to a first base station on the first channel according to the transmit power.

11. The UE of claim 10, wherein the m second channels do not affect power allocation for the first channel when the overlapping time is less than a second preset threshold.

12. The UE of claim 10, wherein the transmit power is allocated to the first channel further according to a first channel priority and priorities of the n second channels when the first required transmit power and the second required transmit power make a total transmit power of the UE greater than a maximum transmit power of the UE.

13. The UE of claim 12, wherein when the first subframe number is i, second subframe numbers of all second subframes that are in the m second subframes and whose end moments overlap an end moment of the first subframe are j, and a second subframe number of one of the m second subframes and whose start moment overlaps a start moment of the first subframe is j+1, the second subframes whose second subframe numbers are j and the second subframe whose second subframe number is j+1 belong to the second cell group, allocating transmit power at least to the first channel according to transmit power required for the first channel and transmit power required for the n second channels comprises:
  determining, by the UE according to the first channel priority of the first subframe whose first subframe number is i and a second channel priority of the second subframes whose second subframe numbers are j, a first pre-allocated transmit power of the first channel in the first subframe whose first subframe number is i and a second pre-allocated transmit power of the second channel in the second subframes whose second subframe numbers are j, the first pre-allocated transmit power and the second pre-allocated transmit power making the total transmit power of the UE less than or equal to the maximum transmit power of the UE;

determining, by the UE according to the first channel priority of the first subframe whose first subframe number is i and the second channel priority of the second subframe whose second subframe number is j+1, third pre-allocated transmit power of the first channel in the first subframe whose first subframe number is i and a fourth pre-allocated transmit power of the second channel in the second subframe whose second subframe number is j+1, the third pre-allocated transmit power and the fourth pre-allocated transmit power making the total transmit power of the UE less than or equal to the maximum transmit power of the UE; and using, by the UE, smaller pre-allocated transmit power in the first pre-allocated transmit power and the third pre-allocated transmit power as the transmit power allocated at least to the first channel.

14. The UE of claim 13, wherein the second channel priority of the second subframe whose second subframe number is j+1 is higher than or equal to the first channel priority of the first subframe whose first subframe number is i, the second channel priority of the second subframe whose second subframe number is j+1 is higher than a channel priority of a channel in a subframe whose subframe number is i+1, and the channel in the subframe whose subframe number is i+1 is a channel in a next subframe of the first subframe whose first subframe number is i.

15. The UE of claim 10, wherein the first channel in the first subframe is determined according to a preset condition.

16. The UE of claim 15, wherein the preset condition comprises a channel priority of a channel that is in the first cell group and that is in a subframe whose subframe number is the same as that of the first subframe, or a transmission time of a channel that is in the first cell group and that is in a subframe whose subframe number is the same as that of the first subframe.

17. The UE of claim 16, wherein determining the first channel that is in the first TAG and in the first subframe comprises:

determining, by the UE as the first channel according to the first channel priority of a first channel that is in the first cell group and that is in the subframe whose subframe number is the same as that of the first subframe, one of at least one channel that is in the first cell group and that has a highest priority of the subframe whose subframe number is the same as that of the first subframe; or determining, by the UE as the first channel according to the transmission time of the first channel that is in the first cell group and that is in the subframe whose subframe number is the same as that of the first subframe, a channel that is in the first cell group and that is the first channel or a last channel transmitted in the subframe whose subframe number is the same as that of the first subframe, a subframe in which the first channel is located being the first subframe, and the first channel being located in the first TAG.

18. The UE of claim 10, wherein the preset threshold is received from the first base station, received from a second base station, or is predefined.

* * * * *

UNITED STATES PATENT AND TRADEMARK OFFICE
CERTIFICATE OF CORRECTION

PATENT NO. : 10,285,136 B2
APPLICATION NO. : 15/945438
DATED : May 7, 2019
INVENTOR(S) : Jiafeng Shao and Bingyu Qu It is certified that error appears in the above-identified patent and that said Letters Patent is hereby corrected as shown below:

On the Title Page

Page (2), Item (56), U.S. PATENT DOCUMENT, Line 3: "Ann" should read "Ahn"

In the Claims

Column 36, Line 33: "TAGs ofa" should read "TAGs of a"

Signed and Sealed this
Sixteenth Day of July, 2019

Andrei Iancu
*Director of the United States Patent and Trademark Office*